United States Patent
Kakumaru

(10) Patent No.: US 8,817,788 B2
(45) Date of Patent: Aug. 26, 2014

(54) WIRELESS COMMUNICATION TERMINAL, METHOD, PROGRAM, RECORDING MEDIUM, AND WIRELESS COMMUNICATION SYSTEM

(75) Inventor: Takahiro Kakumaru, Tokyo (JP)

(73) Assignee: NEC Corporation, Tokyo (JP)

( * ) Notice: Subject to any disclaimer, the term of this patent is extended or adjusted under 35 U.S.C. 154(b) by 354 days.

(21) Appl. No.: 12/863,340

(22) PCT Filed: Jan. 14, 2009

(86) PCT No.: PCT/JP2009/050357
§ 371 (c)(1),
(2), (4) Date: Oct. 8, 2010

(87) PCT Pub. No.: WO2009/090953
PCT Pub. Date: Jul. 23, 2009

(65) Prior Publication Data
US 2011/0013591 A1    Jan. 20, 2011

(30) Foreign Application Priority Data

Jan. 17, 2008   (JP) ................................ 2008-007866

(51) Int. Cl.
*H04L 12/56*   (2006.01)
*H04L 29/12*   (2006.01)
*H04W 36/08*   (2009.01)
*H04W 36/14*   (2009.01)

(52) U.S. Cl.
CPC ............. *H04L 61/103* (2013.01); *H04W 36/08* (2013.01); *H04W 36/14* (2013.01)
USPC ............................ 370/392; 370/331; 370/389

(58) Field of Classification Search
None
See application file for complete search history.

(56) References Cited

U.S. PATENT DOCUMENTS

| | | | | |
|---|---|---|---|---|
| 6,094,659 A | * | 7/2000 | Bhatia | 375/222 |
| 6,262,988 B1 | * | 7/2001 | Vig | 370/401 |
| 6,665,291 B1 | * | 12/2003 | Shahdad et al. | 370/352 |
| 6,982,967 B1 | * | 1/2006 | Leung | 370/328 |
| 7,974,311 B2 | * | 7/2011 | Vesterinen et al. | 370/475 |
| 8,379,559 B2 | * | 2/2013 | Banerjea et al. | 370/312 |
| 2002/0013858 A1 | * | 1/2002 | Anderson | 709/245 |

(Continued)

FOREIGN PATENT DOCUMENTS

| | | |
|---|---|---|
| JP | 2005-333648 A | 12/2005 |
| JP | 2005-348247 A | 12/2005 |

(Continued)

OTHER PUBLICATIONS

Amendment 6: Medium Access Control (MAC) Security Enhancements, 8.4.6.1 Preauthentication and RSNA key management, IEEE Std 802.11 (tm) i-2004, pp. 69-70.

*Primary Examiner* — Bunjob Jaroenchonwanit
(74) *Attorney, Agent, or Firm* — Sughrue Mion, PLLC

(57) ABSTRACT

A wireless communication terminal (1) which performs handover control of wireless base stations acquires a layer 2 address concerning a new wireless base station (3) from a wireless communication interface unit (1A) before handover. A presence confirmation request transmitting unit (1D) transmits a presence confirmation request message to the layer 2 address acquired by an address acquisition unit (1B) via a currently connected wireless base station (2). Based on the presence confirmation response message reception result of a presence confirmation response receiving unit (1E), a subnet determination unit (1F) determines whether the new wireless base station (3) belongs to the same subnet as that of the wireless communication terminal (1).

25 Claims, 11 Drawing Sheets

(56) References Cited

U.S. PATENT DOCUMENTS

| | | | |
|---|---|---|---|
| 2004/0017814 A1* | 1/2004 | Shimada | 370/395.52 |
| 2004/0062267 A1* | 4/2004 | Minami et al. | 370/463 |
| 2005/0255847 A1 | 11/2005 | Han et al. | |
| 2006/0174031 A1* | 8/2006 | Yamakoshi et al. | 709/237 |
| 2007/0064695 A1* | 3/2007 | Song et al. | 370/390 |
| 2007/0091849 A1* | 4/2007 | Park et al. | 370/331 |
| 2009/0161625 A1* | 6/2009 | Karnam et al. | 370/331 |

FOREIGN PATENT DOCUMENTS

| | | |
|---|---|---|
| JP | 2006-087078 A | 3/2006 |
| JP | 2006-093756 A | 4/2006 |
| JP | 3793193 B2 | 7/2006 |
| JP | 2006-262371 A | 9/2006 |
| JP | 2006-304118 A | 11/2006 |

\* cited by examiner

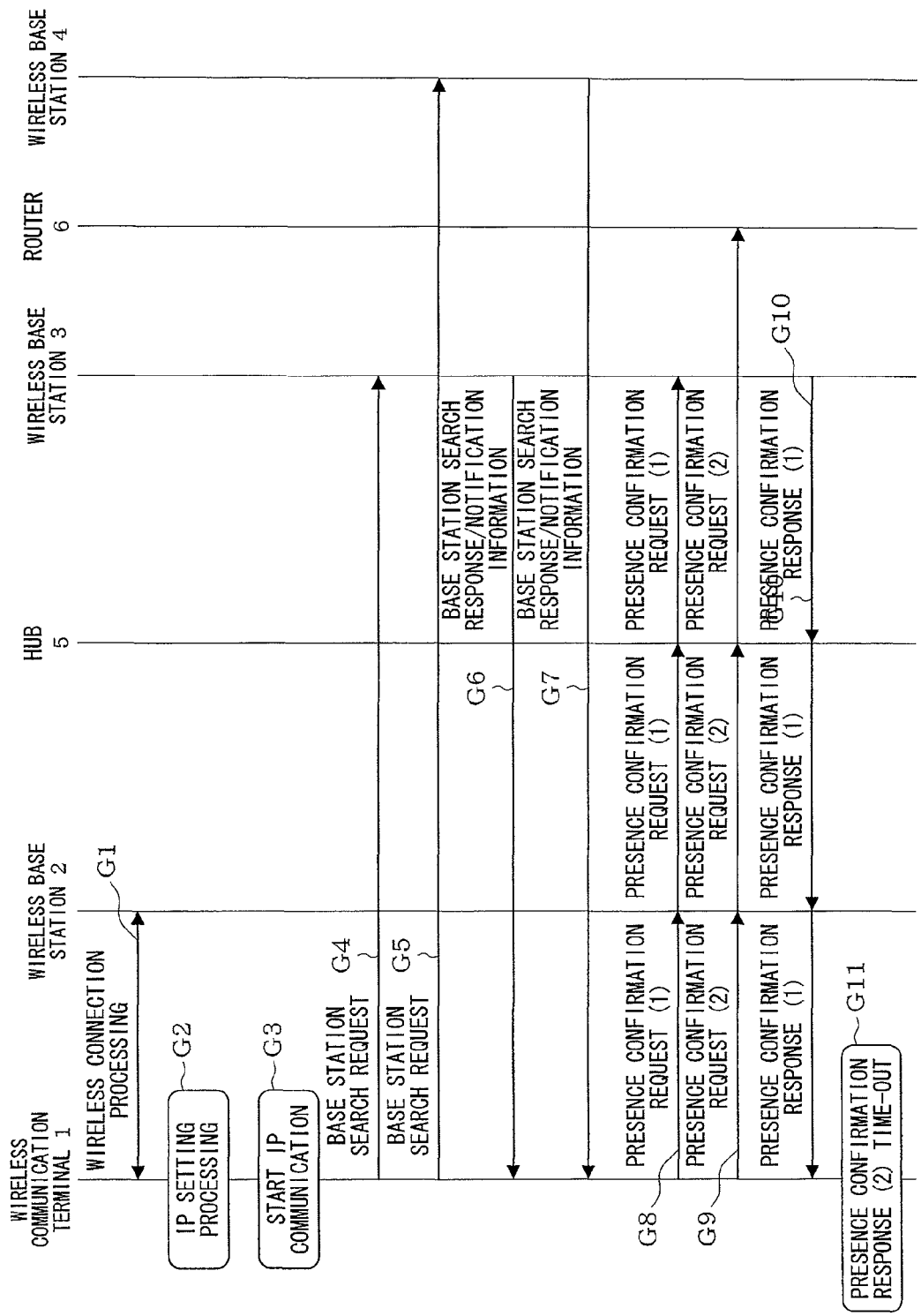

WIRELESS COMMUNICATION TERMINAL, METHOD, PROGRAM, RECORDING MEDIUM, AND WIRELESS COMMUNICATION SYSTEM

TECHNICAL FIELD

The present invention relates to a wireless communication technique and, more particularly, to a technique of confirming the location of a wireless base station.

BACKGROUND ART

In recent years, various kinds of wireless communication devices including a wireless LAN (Local Area Network) are mounted in all sorts of apparatuses such as personal computers, peripheral devices, cellular phones, video game machines, and home electric appliances. Especially, a mobile apparatus such as a notebook computer, cellular phone, or video game machine sometimes moves while using an application. An easily imaginable situation is, for example, a user's moving while calling using a cellular phone.

In moving while keeping wireless communication, the wireless communication terminal may move out of the coverage area of the wireless base station of communication target, or switch the base station of communication target upon detecting the presence of a base station in a better radio wave state based on information sent from wireless base stations. For example, assume that a plurality of connection destination base station candidates exist simultaneously. If the received field strength of the currently connected base station falls below a predetermined threshold, base station switching processing occurs to reconnect the wireless communication terminal to a base station with a stronger received field. The switching processing that occurs at this time is generally called handover.

Occurrence of handover brings about the following situation. Until the wireless communication terminal starts IP (Internet Protocol) data communication with a network via a base station, negotiation and IP setting processing for connection via a wireless layer are necessary. For example, when a dynamic setting method such as DHCP (Dynamic Host Configuration Protocol) is used for the IP setting processing, the wireless communication terminal and the DHCP server normally exchange several packets.

DISCLOSURE OF INVENTION

Problems to be Solved by the Invention

Mainly a large enterprise or the like divides a network into several subnets, and sets and manages them for efficient network management. In this case, since IP communication cannot be done by an IP address set in another subnet upon handover, the DHCP processing cannot be omitted.

In the DHCP, however, IP address setting from the DHCP server to the wireless communication terminal takes time, and accordingly, service stop or packet loss occur upon handover. Frequent handover degrades the communication service quality in the wireless communication terminal. It is therefore necessary to avoid access to, e.g., a DHCP server at the time of handover.

However, the related art cannot determine before execution of handover without requiring any specific server whether a new wireless base station serving as a handover candidate is connected to the same subnet as that of the wireless base station that is being connected.

For example, reference "Japanese Patent No. 3793193" discloses a method which executes, after handover of this type, the DHCP processing while keeping data communication, and compares subnets before and after handover based on information returned from the DHCP server. If the subnets are the same, data communication is continued by continuously using the IP address. If the subnets are different, data communication is interrupted. An IP address acquisition operation is executed, and the data communication is resumed using the newly acquired IP address.

In this case, data communication is continued using the IP address before handover before determining whether the subnets are the same. This may influence the network. In addition, since the processing of the DHCP server ends halfway, its resource is wasted.

A detection method of this type is disclosed in, for example, reference "Japanese Patent Laid-Open No. 2006-093756". In this method, a wireless base station sends information containing an IP layer network address representing the address of the subnet to which the base station itself is connected. This allows to determine in advance a wireless base station connected to the same subnet as that of the currently connected wireless base station, and preferentially connect the determined base station.

However, information sent by a wireless base station is easily available by a third party. This amounts to widely opening the IP network arrangement, and a security threat could occur. In addition, especially when the address system is built using private addresses, a different subnet can easily be assumed to use the same address system coincidentally. The related art cannot cope with such a case.

On the other hand, as described in reference "'8.4.6.1 Preauthentication and RSNA key management', 'Amendment 6: Medium Access Control (MAC) Security Enhancements', IEEE Std 802.11(tm)i-2004, pp. 69-70, Jul. 23, 2004", a method of allowing a wireless communication terminal to communicate with a wireless base station as a handover candidate for preauthentication via a currently connected wireless base station, i.e., a preauthentication procedure method is defined by IEEE (Institute of Electrical and Electronic Engineers): 802.11i that describes security in the IEEE802.11 group. In this method, via a currently connected wireless base station, a wireless communication terminal designates a specific value representing preauthentication of IEEE:802.11i as a value to identity the type of data communication on the data link layer for the MAC address of a handover candidate wireless base station so that communication between the wireless communication terminal and the handover candidate wireless base station is executed.

In this case, however, the handover candidate wireless base station needs to support the preauthentication of IEEE: 802.11i, as a matter of course. In addition, the currently connected wireless base station, which need not always have the function of preauthentication of IEEE:802.11i itself, still needs an operation of recognizing the value to identity the type of data communication on the data link layer and appropriately transferring it to a wireless base station having a specific MAC address. These functions are defined by standardization but are not essential for implementation. It is therefore not easy to expect all wireless base stations to support the functions. Furthermore, these functions are effective only in a single ESS (Extended Service Set) but ineffective across different ESSes, or the functions depend on the ESS.

Another detection method of this type is disclosed in, for example, reference "Japanese Patent Laid-Open No. 2006-262371". In this method, an AP information server is installed in each subnet to collect and set in advance information about wireless base stations. A wireless communication terminal acquires the information of a handover destination from the AP information server prepared in advance. However, since it is necessary to prepare an AP information server for each subnet and set information about APs in advance, problems of cost and expandability remain.

To determine whether an apparatus with an unknown IP address exists in the same subnet as that of a wireless communication terminal, a method is considerable, in which using an acknowledgement based on an ICMP (Internet Control Message Protocol) message or ARP (Address Resolution Protocol) generally used to confirm connection of a network, a wireless communication terminal sequentially transmits a presence confirmation request message to all IP addresses within a range assumed based on the network information of the wireless communication terminal via a currently connected wireless base station, and performs determination based on a presence confirmation response message. Another method is also considerable which sends a message to an apparatus with an unknown IP address using the IP broadcast address as the transmission designation and executes acknowledgement.

In this case, the wireless communication terminal can grasp the MAC address of a wireless base station based on information sent from the wireless base station. Hence, the wireless communication terminal attempts to associate transmission source MAC addresses contained in the presence confirmation response messages with the MAC addresses sent from the wireless base stations.

However, when a wireless base station which has a wireless interface and a wired interface and operates as a bridge receives a response from the wired interface side, the wireless base station uses the MAC address of the wired interface as the transmission source MAC address contained in the presence confirmation response message even if the IP address designated as the transmission designation is the IP address of the wireless base station itself. For this reason, it is difficult to identify whether a presence confirmation response message for a request transmitted by the wireless communication terminal is of the wireless base station.

Additionally, it is easily imaginable that transmitting an acknowledgement message to all IP addresses within an assumed range is not efficient. This increases concerns about network band consumption, and also poses a problem of power consumption from the viewpoint of processing in the wireless communication terminal. For example, a wireless communication terminal that is in a network environment "192.168.0.0/24" transmits 153 acknowledgement messages excepts for the address of its own and addresses "192.168.0.0" and "192.168.0.255" which are not regarded as the address of an apparatus.

In the method of transmitting a message using the IP broadcast address as the transmission designation and executing acknowledgement from the viewpoint of efficiency, it is difficult to associate transmission source MAC addresses with MAC addresses sent from wireless base stations, as described above. Additionally, considering the recent circumstances concerning security, there is not a little possibility that the act of transmitting the presence confirmation message using the IP broadcast address itself is regarded as an attack.

The present invention has been made to solve the above-described problems, and an exemplary object of the invention is to provide a wireless communication terminal, method, program, recording medium, and wireless communication system which allow a wireless communication terminal to determine before handover whether a wireless base station as a handover candidate is connected to the same subnet as that of a wireless base station currently connected to the wireless communication terminal without need of a special server.

Means of Solution to the Problems

In order to achieve the above-described object, a wireless communication terminal according to an exemplary aspect of the invention is a wireless communication terminal including a wireless communication interface unit, comprising an address acquisition unit that acquires, via the wireless communication interface unit, a layer 2 address of a wireless communication interface of a new wireless base station from information transmitted from a currently connected wireless base station, a presence confirmation request generation unit that generates a presence confirmation request message by designating the layer 2 address acquired by the address acquisition unit as a destination address, a layer 2 address of the wireless communication terminal itself as a transmission source address, and one of a broadcast address and a multicast address as a layer 3 address, a presence confirmation request transmitting unit that transmits, via the currently connected wireless base station, the presence confirmation request message generated by the presence confirmation request generation unit, a presence confirmation response receiving unit that receives a presence confirmation response message for the presence confirmation request message, and a subnet determination unit that, when the presence confirmation response receiving unit has received the presence confirmation response message, determines that the new wireless base station belongs to the same subnet as that of the currently connected wireless base station.

A wireless communication method according to another exemplary aspect of the invention is a wireless communication method used in a wireless communication terminal including a wireless communication interface unit, comprising the steps of acquiring, via the wireless communication interface unit, a layer 2 address of a wireless communication interface of a new wireless base station from information transmitted from a currently connected wireless base station, generating a presence confirmation request message by designating the layer 2 address acquired in the step of acquiring the layer 2 address as a destination address, a layer 2 address of the wireless communication terminal itself as a transmission source address, and one of a broadcast address and a multicast address as a layer 3 address, transmitting, via the currently connected wireless base station, the presence confirmation request message generated in the step of generating the presence confirmation request message, receiving a presence confirmation response message for the presence confirmation request message, and when received the presence confirmation response message has been received in the step of receiving the presence confirmation response message, determining that the new wireless base station belongs to the same subnet as that of the currently connected wireless base station.

Effect of the Invention

According to the present invention, a wireless communication terminal can determine before handover whether a wireless base station as a handover candidate is connected to the same subnet as that of a wireless base station currently connected to the wireless communication terminal without need of a special server.

It is therefore possible to prevent handover which requires IP address change after the handover from being executed with priority over handover without IP address change. In addition, wasteful IP address setting processing after the handover can be omitted. It is also unnecessary to prepare a special server to store information about a wireless base station in advance.

BRIEF DESCRIPTION OF DRAWINGS

FIG. 14 is a sequence chart showing the operation of a wireless communication system according to the third exemplary embodiment of the present invention.

BEST MODE FOR CARRYING OUT THE INVENTION

The exemplary embodiments of the present invention will now be described with reference to the accompanying drawings.

[Basic Arrangement of Invention]

Figure 1:
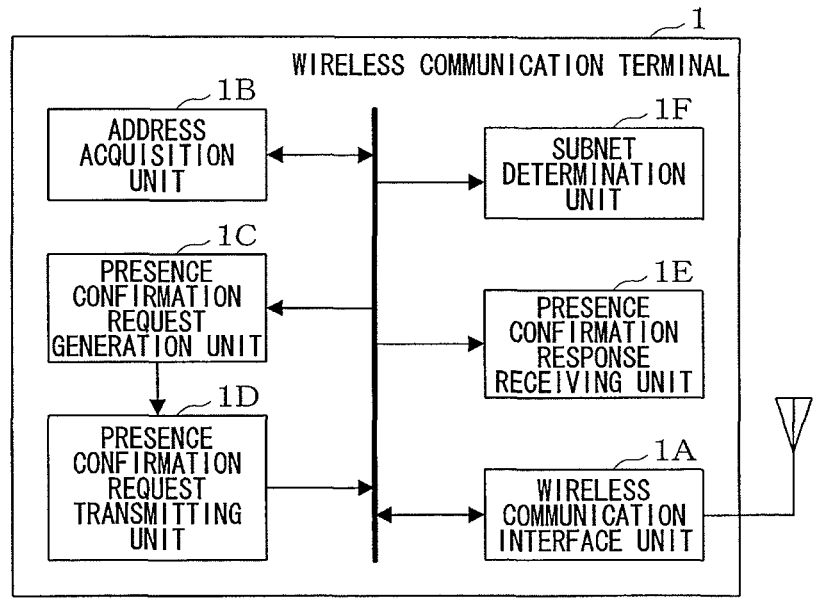
FIG. 1 is a block diagram showing the arrangement of a wireless communication terminal that is the base of the present invention.

A wireless communication terminal that is the base of the present invention will be described first with reference to FIG. 1. FIG. 1 is a block diagram showing the arrangement of a wireless communication terminal as the base of the present invention.

A wireless communication terminal 1 is an apparatus which performs data communication using an IP protocol with a communication apparatus connected to a network via a wireless base station.

The wireless communication terminal 1 includes, as main functional units, a wireless communication interface unit 1A, address acquisition unit 1B, presence confirmation request generation unit 1C, presence confirmation request transmitting unit 1D, presence confirmation response receiving unit 1E, and subnet determination unit 1F.

The wireless communication interface unit 1A has a function of performing wireless communication with a wireless base station.

The address acquisition unit 1B has a function of acquiring, via the wireless communication interface unit 1A of the wireless communication terminal 1, the layer 2 address of the wireless communication interface of a wireless base station from information transmitted from the wireless base station.

The presence confirmation request generation unit 1C has a function of generating a presence confirmation request message by setting the layer 2 address acquired by the address acquisition unit 1B as the destination, the layer 2 address of the wireless communication terminal itself as the transmission source, and the broadcast or multicast address as the layer 3 address.

The presence confirmation request transmitting unit 1D has a function of transmitting, via the currently connected wireless base station, the presence confirmation request message generated by the presence confirmation request generation unit 1C.

The presence confirmation response receiving unit 1E has a function of receiving a presence confirmation response message for the presence confirmation request message.

The subnet determination unit 1F has a function of determining, upon receiving the presence confirmation response message based on the reception result of the presence confirmation response receiving unit 1E, that the wireless base station belongs to the same subnet as that of the wireless communication terminal.

A general wireless communication terminal can grasp IP network address information only after the wireless base station has been switched in handover control. Hence, the IP address information of the connected network is confirmed after the handover.

In the present invention, placing focus on the fact that the IP address can be grasped in the state after handover, the presence confirmation request message is transmitted via the wireless base station connected before handover using, as the destination, the layer 2 address of a new wireless base station acquired via the wireless communication interface unit 1A of the wireless communication terminal 1.

More specifically, at the time of handover, the address acquisition unit 1B acquires, via the wireless communication interface unit 1A, the layer 2 address of the wireless communication interface of the new wireless base station from information transmitted from the currently connected wireless base station.

Next, the presence confirmation request generation unit 1C generates a presence confirmation request message by setting the layer 2 address as the destination, the layer 2 address of the wireless communication terminal itself as the transmission source, and the broadcast or multicast address as the layer 3 address.

Subsequently, the presence confirmation request transmitting unit 1D transmits the presence confirmation request message generated by the presence confirmation request generation unit 1C from the wireless communication interface unit 1A via the currently connected wireless base station.

After that, the presence confirmation response receiving unit 1E receives a presence confirmation response message corresponding to the presence confirmation request message via the wireless communication interface unit 1A.

Accordingly, the subnet determination unit 1F determines, upon receiving the presence confirmation response message based on the reception result of the presence confirmation response receiving unit 1E, that the new wireless base station belongs to the same subnet as that of the wireless communication terminal.

This makes it possible to grasp, before handover, whether the new wireless base station and the wireless base station currently connected to the wireless communication terminal belong to the same subnet without requiring any information server in which the information of each wireless base station is set in advance.

A wireless base station belonging to the same subnet may preferentially be selected, as a handover destination, from handover candidate wireless base stations. Alternatively, based on the same subnet determination result grasped in advance, an IP communication setting before handover may continuously be used in case of handover to a wireless base station belonging to the same subnet. If handover to a wireless base station belonging to a different subnet has occurred, an IP communication setting may be required after the handover and used.

First Exemplary Embodiment

Figure 2:
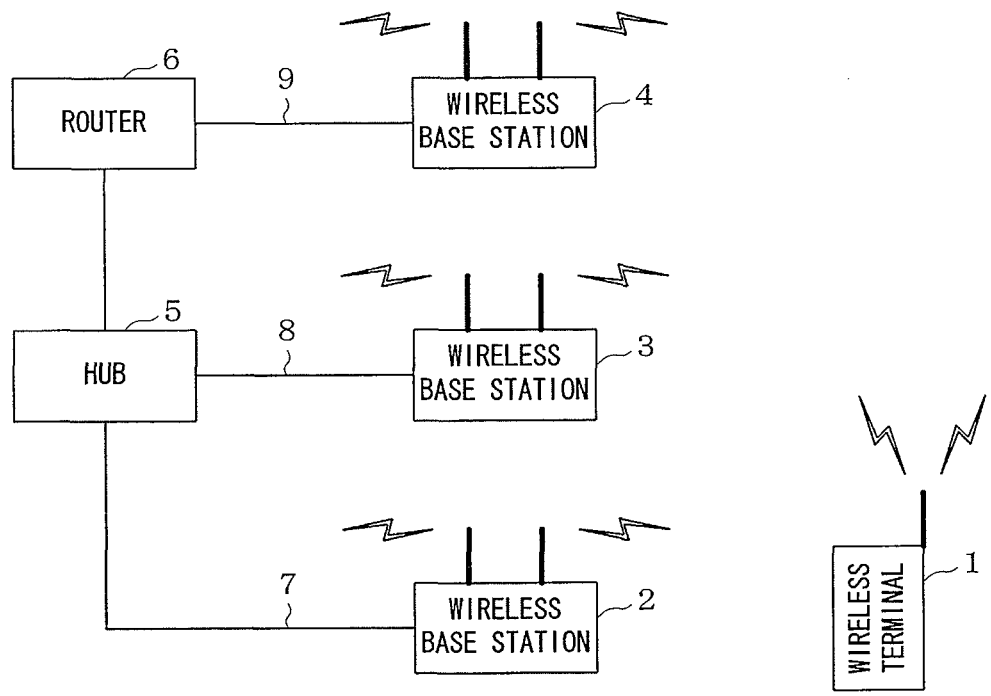
FIG. 2 is a block diagram showing the arrangement of a wireless communication system according to the first exemplary embodiment of the present invention.

A wireless communication system according to the first exemplary embodiment of the present invention will be described next with reference to FIG. 2. FIG. 2 is a block diagram showing the arrangement of the wireless communication system according to the first exemplary embodiment of the present invention.

The wireless communication system includes networks 7, 8, and 9 which connect LAN channels or WAN (Wide Area Network) channels, a wireless base station 2 connected to the network 7, a wireless base station 3 connected to the network 8, a wireless base station 4 connected to the network 9, a hub 5 connected to the networks 7 and 8 and a router 6, the router 6 which separates the subnet of the networks 7 and 8 and that of the network 9, and a wireless communication terminal 1 which is connected to a network via the wireless base station 2 using a radio wave as a transmission medium.

The wireless base station 2 has the function of a base station complying with the IEEE:802.11 standard. The wireless base station 2 has, e.g., a function of executing connection negotiation in accordance with a connection negotiation request from the wireless communication terminal, and when the connection negotiation is completed, relaying data communication between the wireless communication terminal 1 and a device connected to the network 7.

More specifically, the wireless base station 2 has a function of establishing a communication channel to the wireless communication terminal 1 complying with the IEEE:802.11 standard, a function of performing authentication for the wireless communication terminal 1 as needed, a function of encrypting the communication channel to the wireless communication terminal 1 as needed, a function of managing the wireless communication terminal 1, a function of performing data communication with the wireless communication terminal via the established communication channel, and a function of relaying data between the wireless communication terminal 1 and the network 7.

The wireless base station 3 has, e.g., a function of performing communication with a device connected to the network 8 using IP (Internet Protocol), in addition to the same functions as those of the wireless base station 2. The wireless base station 3 also has a function of receiving a frame transmitted to it and processing the frame in the wireless base station 3.

More specifically, upon receiving a frame transmitted to the MAC (Media Access Control) address given to the interface of the wireless base station 3, the wireless base station 3 identifies the frame type, transfers the data to a protocol stack adaptive to the type, and causes the protocol stack to execute processing. For example, if the frame type is "IP protocol", the frame is transferred to a protocol stack for processing IP and processed. The wireless base station 3 has a function of similarly processing a frame transmitted not to the MAC address of the wireless base station 3 but to the broadcast address, i.e., "FF:FF:FF:FF:FF:FF".

The wireless base station 3 also has a function of receiving a presence confirmation request message transmitted to it and returning a presence confirmation response to the transmission source address. The wireless base station 3 has a function of returning a presence confirmation response message even upon receiving a presence confirmation request not to the wireless base station 3 but to the broadcast address. More specifically, the address indicates the IP address set in the wireless base station 3, an IP address formed from a network address portion and an all-ones host address portion, or an all-ones IP address.

For example, if the wireless base station 3 has an IP address "192.168.0.10" and a subnet address "255.255.255.0", the above-described address indicates not only "192.168.0.10" but also "192.168.0.255" and "255.255.255.255". Note that the wireless base station may also have a function of performing the same processing when all the bits of the host address portion or IP address are not "1"s but "0"s. The IP address for the wireless base station 3 may be set statically or dynamically by DHCP (Dynamic Host Configuration Protocol) or the like, and the setting method is not required here.

Note that the functions of the wireless base station 3 are not special in the present invention but provided in a general apparatus. The wireless base station 2 may have the functions of the wireless base station 3. However, these functions are not particularly necessary in the present invention.

The wireless base station 4 may have the same functions as those of the wireless base station 2 or the same functions as those of the wireless base station 3.

The wireless communication terminal 1 has the function of a terminal complying with the IEEE:802.11 standard. The wireless communication terminal 1 has, e.g., a function of communicating with a device connected to the network using an IP protocol via the wireless base station 2. More specifically, the wireless communication terminal 1 roughly has the following functions as a terminal complying with the IEEE:802.11 standard. The wireless communication terminal 1 has a function of searching for a wireless base station complying with the IEEE:802.11 standard, a function of establishing a communication channel to the wireless base station, a function of performing authentication for the wireless base station as needed, a function of encrypting the communication channel to the wireless base station as needed, and a function of performing data communication with the wireless base station via the established communication channel.

For network communication via the wireless base station 2, the wireless communication terminal 1 performs connection negotiation with the wireless base station 2 using a wireless physical layer. At this time, authentication processing or the like is additionally performed between the wireless communication terminal 1 and the wireless base station 2 as needed. When connection negotiation is completed, the wireless communication terminal 1 can perform network communication via the wireless base station 2. Note that the wireless communication terminal 1 may have a function of permanently setting an IP address or a function of dynamically setting an IP address by DHCP or the like when performing communication using an IP protocol, and the setting method is not required here.

The wireless communication terminal 1 also has a function of transmitting a presence confirmation request message to a device on the network via the wireless base station 2, and a function of receiving a presence confirmation response message corresponding to the presence confirmation request message.

The hub 5 may have a function as a general repeater hub or as a switching hub, and has a function of relaying data link layer (layer 2) data. More specifically, the hub 5 has a function of receiving data link layer data via one interface and transferring it via another interface. A repeater hub has a function of transferring data not only to the transmission designation layer 2 address (MAC address) but to all interfaces. A switching hub has a function of transferring data only to the MAC address and interfaces specified based on the communication state up to that point of time. The switching hub also has a function of transferring data to all interfaces if no interfaces can be specified. In this arrangement, the hub 5 can be of either type.

The router 6 has, e.g., a function of relaying data of the network layer or transport layer to one network, a function of analyzing the protocol of the network layer or transport layer and transferring data, and a function of determining a channel to or not to transfer data based on the address of the network layer. The router 6 also has a function of separating the subnet formed by the networks 7 and 8 and that formed by the network 9.

[Wireless Communication Terminal]

Figure 3:
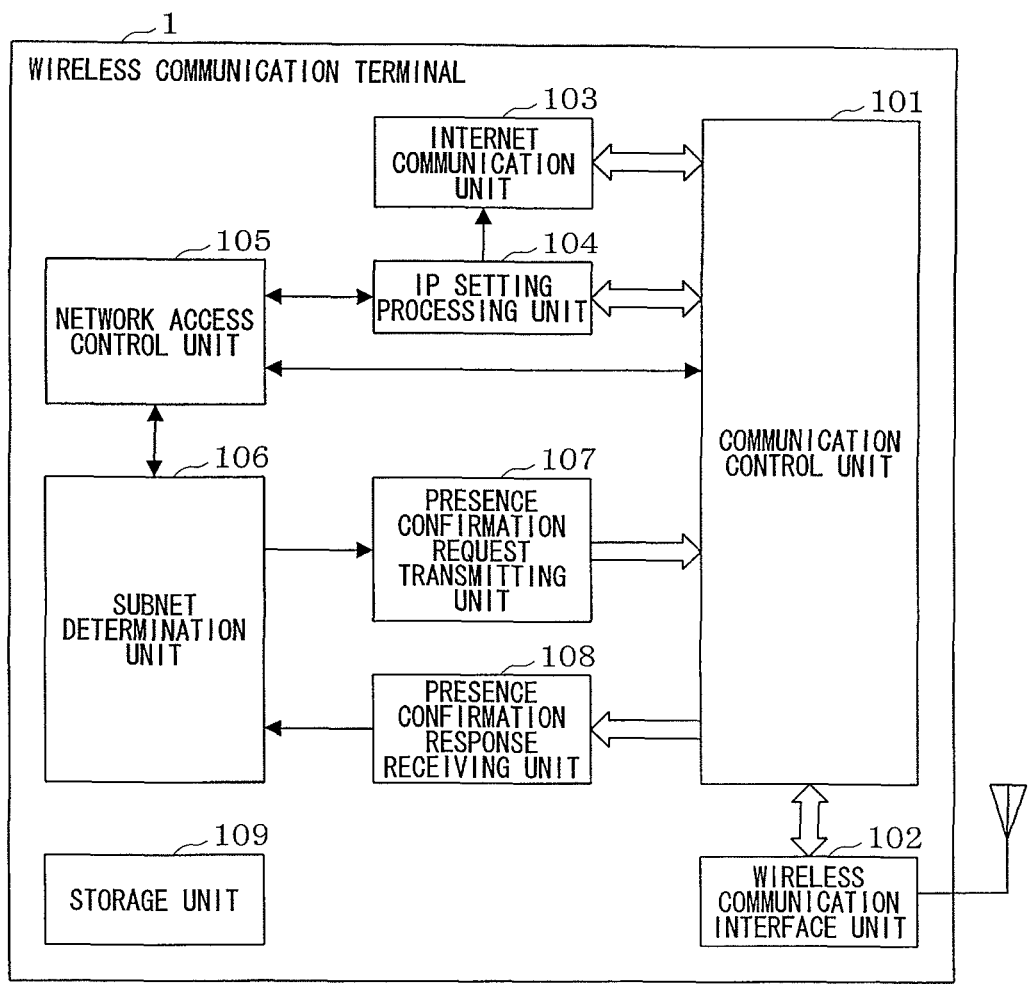
FIG. 3 is a block diagram showing the arrangement of a wireless communication terminal according to the first exemplary embodiment of the present invention.

The arrangement of the wireless communication terminal according to the first exemplary embodiment of the present invention will be described next with reference to FIG. 3. FIG. 3 is a block diagram showing the arrangement of the wireless communication terminal according to the first exemplary embodiment of the present invention.

The wireless communication terminal 1 includes, as main functional units, a communication control unit 101, wireless communication interface unit 102, Internet communication unit 103, IP setting processing unit 104, network access control unit 105, subnet determination unit 106, presence confirmation request transmitting unit 107, presence confirmation response receiving unit 108, and storage unit 109. These functional units are connected to be data-communicable with each other.

The communication control unit 101 has, e.g., a function of managing a communication channel to a wireless base station or outputting a data transmission/reception instruction via the wireless communication interface unit 102. More specifically, the communication control unit 101 has a function of searching for a wireless base station, a function of performing connection negotiation to establish a communication channel to a wireless base station by transmitting a connection request to the wireless base station from the wireless communication interface unit 102, a function for a series of security processes such as data encryption and decryption, and a function of transmitting/receiving data to/from a wireless base station for which a communication channel has been established.

The function of the communication control unit 101 for data transmission/reception includes a function of implementing transfer, to/from the functional units having the transmission/reception function, of data received or to be transmitted by the wireless communication terminal 1. More specifically the communication control unit 101 has a function of transferring data received from the wireless base station 2 via the wireless communication interface unit 102 to each functional unit, and a function of transferring data received from each functional unit to the wireless base station via the wireless communication interface unit 102. The communication control unit 101 may have a function of extracting only data specified by each functional unit in advance concerning received data and transferring it to the functional unit. For example, when the Internet communication unit 103 designates to transfer only IP packets, the communication control unit 101 transfers only IP packets of received data to the Internet communication unit 103.

The communication control unit 101 also has a function of executing connection processing for a wireless base station in accordance with an instruction from the network access control unit 105. More specifically, the communication control unit 101 has a function of implementing, based on a connection request to a wireless base station designated by the network access control unit 105, connection processing for the wireless base station, a function of, when the connection processing is completed, notifying the network access control unit 105 of it, and a function of implementing, based on a disconnection request from the network access control unit 105, disconnection processing for the wireless base station.

The communication control unit 101 also has a function of notifying the network access control unit 105 of a wireless base station search result. More specifically, the communication control unit 101 has a function of, based on a wireless base station search request from the network access control unit 105, transmitting a frame representing transmission of wireless base station information to wireless base stations via the wireless communication interface unit 102, a function of collecting wireless base station information received from the wireless communication interface unit 102, and a function of notifying the network access control unit 105 of the collected wireless base station information.

The communication control unit 101 may also have a function of collecting notification information periodically transmitted from the wireless base stations without transmitting a frame representing transmission of wireless base station information to the wireless base stations, or one of the functions. The wireless base station information collected here contains the identifier of a network to which the wireless base station belongs, for example, ESSID (Extended Service Set Identifier) of IEEE:802.11, an identifier unique to the wireless base station such as BSSID (Basic Service Set Identifier), channel information, and a received field strength.

The communication control unit 101 may also have a function of, upon receiving a wireless base station search request from the network access control unit 105, returning a search result to the network access control unit 105. More specifically, the communication control unit 101 has a function of, upon receiving a request from the network access control unit 105 to search for a wireless base station, transmitting a frame representing transmission of wireless base station information to the wireless base stations via the wireless communication interface unit 102.

The wireless communication interface unit 102 has, e.g., a function of transmitting/receiving data via a wireless medium. More specifically, the wireless communication interface unit 102 has a function of wirelessly transmitting data received from the communication control unit 101, and a function of transferring wirelessly received data to the communication control unit 101. The wireless communication interface unit 102 has a function of, when the destination address of received data is the MAC address of the wireless communication terminal itself, the broadcast address, or the multicast address, determining that the terminal itself should process the data and transferring it to the communication control unit 101.

The Internet communication unit 103 has, e.g., a function of performing data communication processing based on an IP protocol. More specifically, the Internet communication unit 103 has a function of requesting the communication control unit 101 to transmit an IP packet, a function of receiving a received IP packet from the communication control unit 101, and a function of implementing IP packet transmission/reception based on information sent from the IP setting processing unit 104 concerning the IP address of the wireless communication terminal itself and the like to be used for IP packet transmission/reception. The Internet communication unit 103 may have a function of setting the communication control unit 101 to transfer only IP packets out of received data.

The IP setting processing unit 104 has, e.g., a function of controlling IP data communication by setting, in the Internet communication unit 103, information about an IP address and the like necessary for data communication based on an IP protocol. More specifically, the IP setting processing unit 104 has a function of sending information necessary for IP data communication, i.e., the IP address, subnet mask, default gateway, and DNS (Domain Name System) server address of the wireless communication terminal to the Internet communication unit 103, a function of notifying the network access control unit 105 that setting in the Internet communication unit 103 is completed, i.e., IP data communication is possible, and a function of stopping IP data communication in accordance with a request from the network access control unit 105.

The information such as an IP address required here may be held in advance or dynamically acquired. More specifically, to hold the information in advance, it is set in the Internet communication unit 103. To dynamically acquire the information, the IP setting processing unit 104 has a function of implementing IP setting acquisition processing, and sets information about an acquired IP address and the like in the Internet communication unit 103. The function of dynamically implementing the IP setting acquisition processing may be formed using a stateful automatic setting means such as DHCP or, if IPv6 (IP version 6) is used, using a stateless automatic setting means of IPv6. Whether to use preset information as information about the IP address and the like or use the dynamic setting means may be notified by the network access control unit 105. Alternatively, these pieces of information may be stored in a parameter storage unit (not shown) and acquired from the storage unit.

The IP setting processing unit 104 also has a function of managing IP address information and the like set in the Internet communication unit 103. More specifically, the IP setting processing unit 104 has a function of holding IP address information and the like set in the Internet communication unit 103, and a function of sending IP address information in response to an external IP address information acquisition request from the network access control unit 105, presence confirmation request transmitting unit 107, presence confirmation response receiving unit 108, or the like.

The network access control unit 105 has, e.g., a function of controlling the connection state to a wireless base station. More specifically, the network access control unit 105 has a function of acquiring a wireless base station search result from the communication control unit 101, a function of selecting, based on the search result, a wireless base station to be connected, a function of controlling the communication control unit 101 to execute connection processing for the selected wireless base station, and a function of controlling the start and stop of IP data communication for the IP setting processing unit 104. The network access control unit 105 may have a function of requesting the communication control unit 101 to execute a wireless base station search. The network access control unit 105 also has a function of managing a wireless communication connection state and an IP data communication connection state.

The network access control unit 105 also has a function of requesting the subnet relationship between the currently connected wireless base station and each wireless base station included in the search result of the subnet determination unit 106. More specifically, the network access control unit 105 has a function of extracting an identifier unique to a wireless base station, i.e., layer 2 address from the wireless base station search result acquired from the communication control unit 101, a function of notifying the subnet determination unit 106 of the extracted identifier unique to the wireless base station, and a function of receiving, from the subnet determination unit 106, a same subnet determination result for an identifier unique to a designated wireless base station. For example, in IEEE:802.11, the network access control unit 105 extracts, from a search result, BSSID, i.e., MAC address as an identifier unique to a wireless base station, sends the MAC address to the subnet determination unit 106, and receives a subnet relationship result for the sent MAC address, i.e., whether the wireless base station belongs to the same subnet.

The subnet determination unit 106 has, e.g., a function of determining whether a device having a MAC address sent from the network access control unit 105 belongs to the same subnet as the subnet to which the wireless communication terminal belongs. More specifically, the subnet determination unit 106 has a function of acquiring a MAC address from the network access control unit 105, a function of requesting the presence confirmation request transmitting unit 107 to transmit a presence confirmation request message to the received MAC address serving as a transmission designation while simultaneously sending the MAC address, a function of acquiring, from the presence confirmation response receiving unit 108, a notification representing whether a presence confirmation response message for the transmitted presence confirmation request message has been received, and a function of determining that the device belongs to the same subnet if the presence confirmation response message exists, or that the device does not belong to the same subnet if no presence confirmation response message exists.

The subnet determination unit 106 may have a time-out function. When a predetermined time has elapsed without presence confirmation response message reception by the presence confirmation response receiving unit 108 after the subnet determination unit 106 has requested the presence confirmation request transmitting unit 107 to transmit a presence confirmation request message, the time-out function determines that a time-out has occurred, and no presence confirmation response message has been received. The time-out value may be held in the subnet determination unit 106 in advance, externally designated by the network access control unit 105 or the like, or stored in a parameter storage unit (not shown) and acquired from the storage unit.

The presence confirmation request transmitting unit 107 has, e.g., a function of transmitting a presence confirmation request message to a received MAC address serving as a destination via the communication control unit 101. More specifically, the presence confirmation request transmitting unit 107 has a function of receiving a MAC address from the subnet determination unit 106, a function of generating data link layer data which should be exchanged in the data link layer, sets the received MAC address as the transmission designation and the MAC address of the wireless communication terminal itself as the transmission source, represents that the payload portion of the data link layer data is a presence confirmation request message, and includes the presence confirmation request message in the payload portion, and a function of transmitting the data link layer data via the communication control unit 101.

The MAC address of the wireless communication terminal itself may be held in advance, acquired from the communication control unit 101 or the wireless communication interface unit 102, or stored in a parameter storage unit (not shown) and read out from it.

Figure 4:
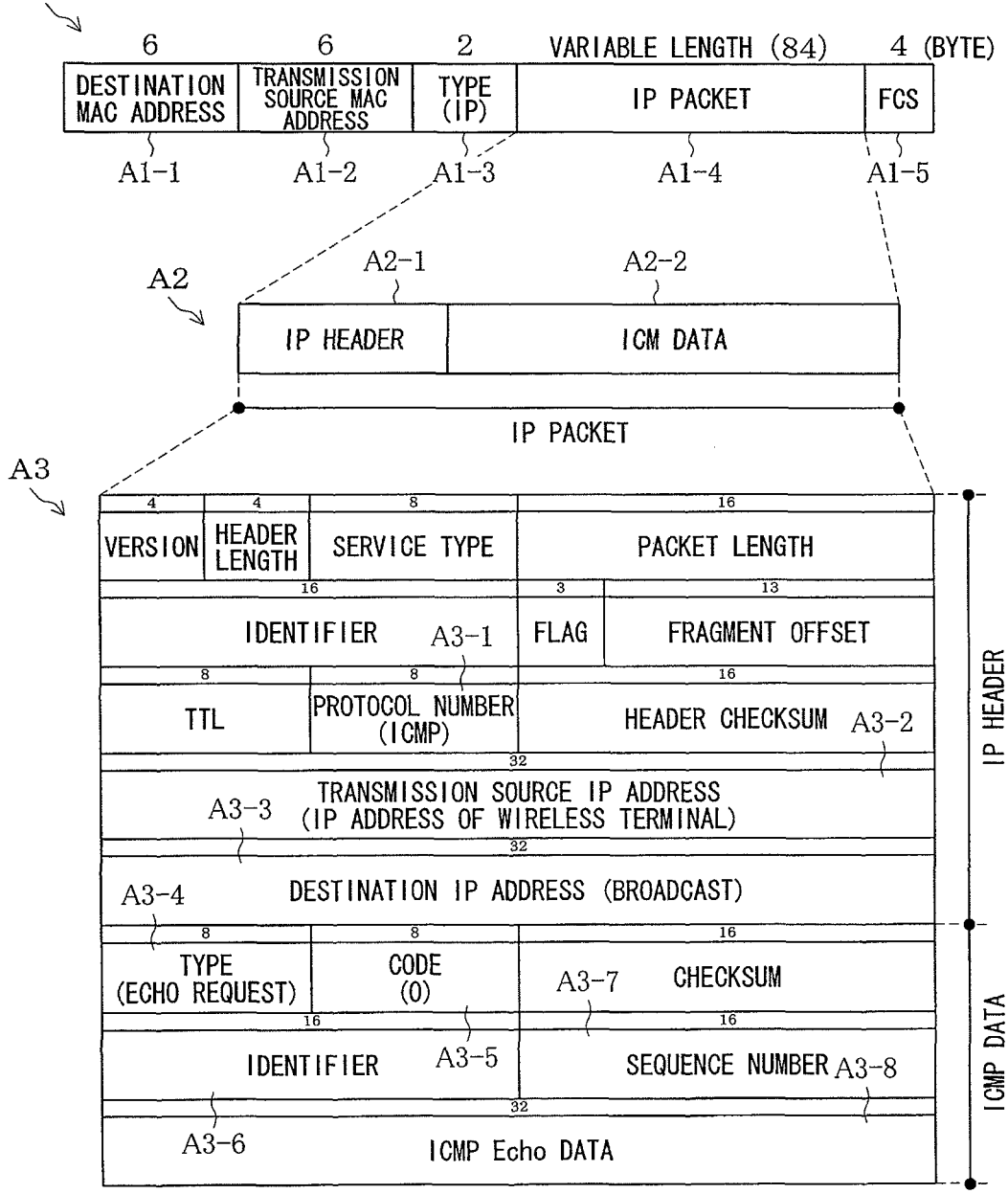
FIG. 4 is a view showing an example of the structure of a presence confirmation message.

FIG. 4 shows an example of the structure of a presence confirmation message. As shown in FIG. 4, a MAC address received from the subnet determination unit 106 is set as a destination MAC address A1-1. The MAC address of the wireless communication terminal itself is set as a transmission source MAD address A1-2.

Especially, the presence confirmation request message is a packet implemented on the IP, as shown in FIG. 4. A transmission source IP address A3-2 in an IP header A2-1 includes the IP address of the wireless communication terminal itself, for example, "192.168.1.125". A destination IP address A3-3 includes an IP broadcast address, for example, "255.255.255.255". A protocol number A3-1 representing the type of IP payload portion is ICMP. An IP payload portion A2-2 includes ICMP:Echo Request message.

Hence, the presence confirmation request message is formed by encapsulating data to be communicated on the IP protocol and designating the broadcast or multicast address as the transmission designation IP address of the IP header. A detailed example is data that encapsulates the ICMP:Echo Request message.

The broadcast address designated as the destination IP address A3-3 need not always be "255.255.255.255", and may be "0.0.0.0". If the broadcast address within the subnet to which the wireless communication terminal belongs, i.e., the IP address of the wireless communication terminal 1 is "192.168.1.125", and the subnet mask is "255.255.255.0", "192.168.1.255", "193.168.1.0", or the like may be designated. If IPv6 is used, the broadcast address in IPv6 is used, as can easily be assumed. The IP address of the wireless communication terminal 1 itself may be held in the presence confirmation request transmitting unit 107 in advance, or acquired from the IP setting processing unit 104. The IP address is preferably acquired from the IP setting processing unit 104 considering that it is used for communication by the wireless communication terminal 1.

The presence confirmation request message need not always be the ICMP:Echo Request message, and may be request data based on a protocol that can be implemented on the IP and allows to expect a response for a request. Note that in this case as well, a broadcast address is designated as the destination IP address. The presence confirmation request may be request data based on a protocol that can be implemented in the data link layer and allows to expect a response for a request. In this case as well, the MAC address of the wireless communication terminal itself is set as the transmission source address in the data link layer, and the MAC address received from the subnet determination unit 106 is set as the destination address.

The presence confirmation response receiving unit 108 has, e.g., a function of, when data received by the wireless communication interface unit 102 and acquired via the communication control unit 101 is a presence confirmation response message for presence confirmation request transmission, notifying the subnet determination unit 106 of it.

More specifically, the presence confirmation response receiving unit 108 has a function of acquiring, via the communication control unit 101, data received by the wireless communication interface unit 102, and a function of analyzing the acquired data, and if the analyzed data complies with a filtering rule held in advance by the presence confirmation response receiving unit 108, notifying the subnet determination unit 106 that a presence confirmation response has been received, or if the data does not comply with the rule, discarding the acquired data.

The filtering rule in the presence confirmation response receiving unit 108 is designed to extract a presence confirmation response message corresponding to a presence confirmation request message transmitted by the presence confirmation request transmitting unit 107. For example, if the presence confirmation request message transmitted by the presence confirmation request transmitting unit 107 is ICMP: Echo Request message, the presence confirmation response message is ICMP:Echo Reply message.

In this case, the filtering rule is designed to extract data which is an IP packet transmitted to the wireless communication terminal itself, and in which a value representing the type of IP payload portion is ICMP, and the IP payload portion includes ICMP:Echo Reply message. Note that the filtering rule may be designed to extract not ICMP:Echo Reply but a presence confirmation response message corresponding to the presence confirmation request message used by the presence confirmation request transmitting unit 107.

The presence confirmation response receiving unit 108 may, when notifying the subnet determination unit 106 that a presence confirmation response message has been received, send only a notification representing the reception or send the presence confirmation response message itself to the subnet determination unit 106 together.

The storage unit 109 has a function of storing programs for implementing the processes of the above-described units.

One of the network access control unit 105, Internet communication unit 103, IP setting processing unit 104, and communication control unit 101 or a combination of some of them constitutes the address acquisition unit 1B.

Figure 5:
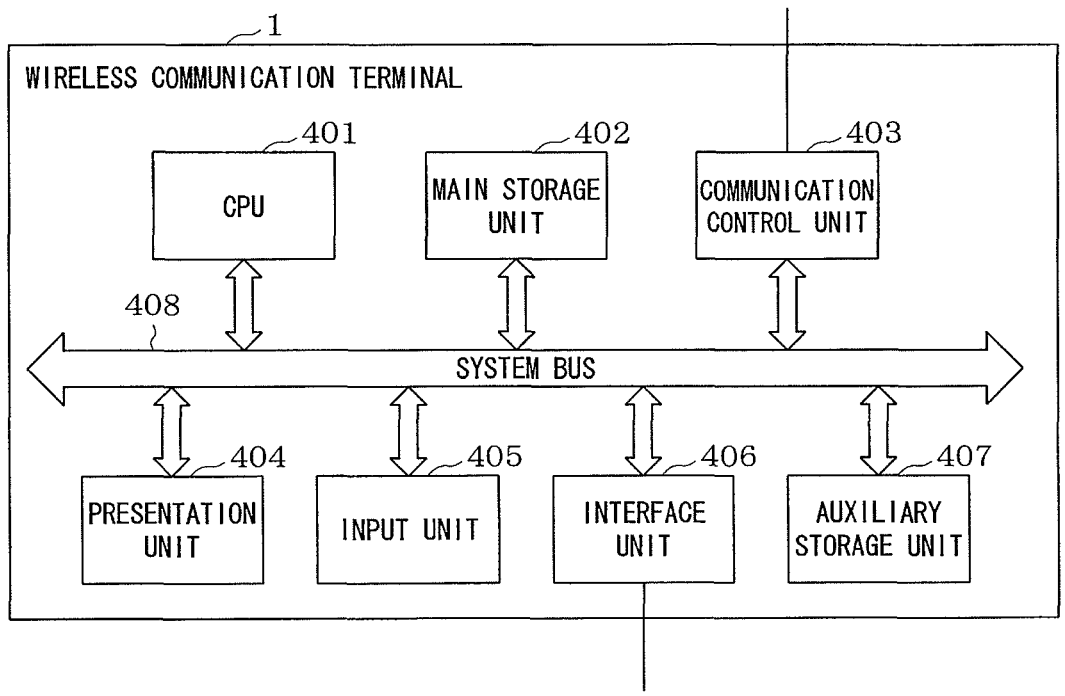
FIG. 5 is a block diagram showing the hardware configuration of the wireless communication terminal 1 according to the first exemplary embodiment of the present invention.

The hardware configuration of the wireless communication terminal 1 will be described here with reference to FIG. 5. FIG. 5 is a block diagram showing the hardware configuration of the wireless communication terminal 1 according to the first exemplary embodiment of the present invention.

Referring to FIG. 5, the wireless communication terminal 1 according to the present invention can be implemented by the same hardware configuration as that of a general computer apparatus. The wireless communication terminal 1 includes a CPU (Central Processing Unit) 401, a main storage unit 402 formed from a main memory such as a RAM (Random Access Memory) and used as a work area or temporary save area of data, a communication control unit 403 which performs wireless communication with the network 7 or wireless base station 2 to transmit/receive data via a wireless network, a presentation unit 404 such as a liquid crystal display, printer, or speaker, an input unit 405 such as a keyboard, keypad, or pointing device, an interface unit 406 connected to a peripheral device to transmit/receive data, an auxiliary storage unit 407 (storage unit 109) that is a hard disk drive formed from a nonvolatile memory such as a ROM (Read Only Memory), magnetic disk, or semiconductor memory, and a system bus 408 which connects the above-described constituent elements of the information processing apparatus to each other.

The wireless communication terminal 1 according to the present invention can implement its operation not only in terms of hardware by mounting, in the wireless communication terminal, a circuit portion including a hardware component such as an LSI (Large Scale Integration) incorporating a program for implementing the functions but also in terms of software by causing the CPU 401 on the computer processing apparatus to execute the programs for providing the functions of the above-described constituent elements.

More specifically, the CPU 401 loads the programs stored in the auxiliary storage unit 407 (storage unit 109) to the main storage unit 402 and executes them to control the operation of the wireless communication terminal 1, thereby implementing the above-described functions in terms of software. Note that a wireless base station may have the above-described arrangement and implement the above-described functions of the wireless base station in terms of hardware or software.

Operation of First Exemplary Embodiment

Figure 6:
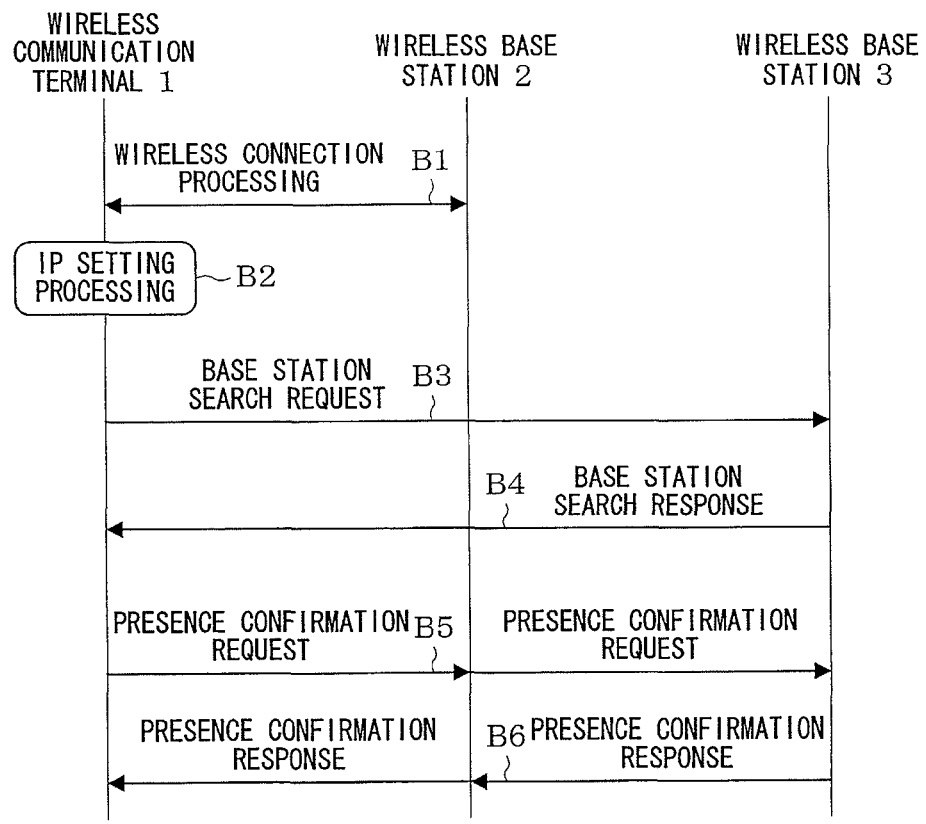
FIG. 6 is a sequence chart showing the operation of the wireless communication system according to the first exemplary embodiment of the present invention.
Figure 7:
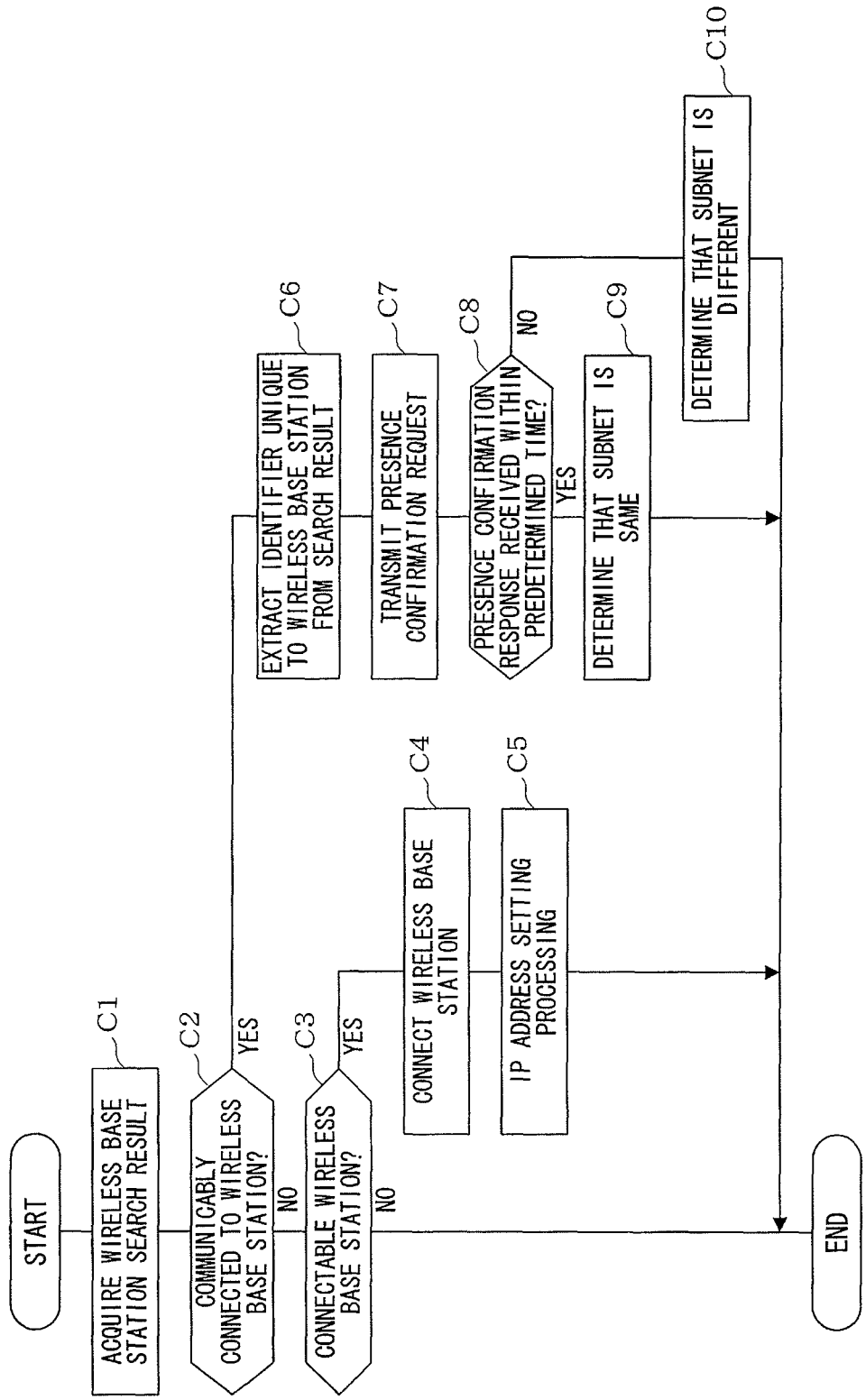
FIG. 7 is a flowchart illustrating the operation of the wireless communication terminal according to the first exemplary embodiment of the present invention.

The operations of the wireless communication system and wireless communication terminal according to the first exemplary embodiment of the present invention will be described next with reference to FIGS. 6 and 7. FIG. 6 is a sequence chart showing the operation of the wireless communication system according to the first exemplary embodiment of the present invention. FIG. 7 is a flowchart illustrating the operation of the wireless communication terminal according to the first exemplary embodiment of the present invention.

Note that the processes shown in FIGS. 6 and 7 are implemented by causing the CPU 401 of the wireless communication terminal 1 to load the programs stored in the storage unit 109 to the main storage unit 402 and execute them.

First, the wireless communication terminal 1 is capable of data communication with a device on the network via the wireless base station 2 (step B1). At this time, the wireless communication terminal 1 sends a connection request to the wireless base station 2, and performs connection negotiation with the wireless base station 2. As a result, communication channel establishment is completed, thereby enabling data communication with the wireless base station 2 via the communication channel (steps C1 to C4).

For example, connection negotiation between the wireless communication terminal 1 and the wireless base station 2 is IEEE:802.11 connection negotiation. The communication may be encrypted communication using WEP (Wired Equivalent Privacy), encrypted communication using a WEP key that is dynamically set when connection is permitted as a result of IEEE:802.1x authentication, or encrypted communication using TKIP (Temporal Key Integrity Protocol) or an encryption algorithm called CCMP (Counter-mode CBC-MAC Protocol) based on AES (Advanced Encryption Standard) via a connection of higher security using WPA (Wi-Fi Protected Access) or WPA2 (WPA version2).

At this time, the network access control unit 105 and the communication control unit 101 of the wireless communication terminal 1 operate in the following way. The network access control unit 105 acquires a wireless base station search result from the communication control unit 101, selects the wireless base station 2 to be connected from the search result, and requests the communication control unit 101 to connect the selected wireless base station 2. The communication control unit 101 performs connection processing of the designated wireless base station, thereby executing connection processing of the wireless base station 2. Note that when connection processing of the wireless base station 2 is completed, the communication control unit 101 notifies the network access control unit 105 of the completion.

When connection negotiation with the wireless base station 2 is completed, the wireless communication terminal 1 sets the IP address and the like to prepare for data communication based on an IP protocol (step B2 and step C5).

At this time, the network access control unit 105, IP setting processing unit 104, and Internet communication unit 103 of the wireless communication terminal 1 operate in the following way.

Upon receiving, from the communication control unit 101, a notification representing that the connection processing of the wireless base station is completed, the network access control unit 105 requests the IP setting processing unit 104 to execute setting necessary for IP data communication. The network access control unit 105 receives a notification representing the completion of setting from the IP setting processing unit 104, and thus grasps that the terminal is ready for IP data communication. (step C5).

Upon receiving the request to execute setting necessary for IP data communication, the IP setting processing unit 104 sets an IP address and the like in the Internet communication unit 103 (step C5). The information of the IP address and the like includes the IP address, subnet mask, default gateway, and DNS server address of the wireless communication terminal 1. If the information of the IP address information and the like to be set is held in advance, the pieces of information are set in the Internet communication unit 103. If the information of the IP address information and the like to be set is not held and needs to be acquired dynamically, IP address information acquisition processing is executed, and consequently acquired information of the IP address and the like is set in the Internet communication unit 103.

To dynamically acquire the information, the IP setting processing unit 104 executes data exchange for IP acquisition processing via the communication control unit 101. For example, when attempting to acquire the IP address using DHCP, data exchange necessary for it is implemented via the communication control unit 101. When setting the IP address and the like in the Internet communication unit 103 is completed, the IP setting processing unit 104 stores the information of the IP address and the like, and notifies the network access control unit 105 that setting the IP address and the like is completed, and the terminal is ready for IP data communication.

The Internet communication unit 103 completes setting necessary for executing IP data communication based on the setting from the IP setting processing unit 104. When the setting is completed, IP data communication via the communication control unit 101 is possible (step C5). For example, setting is completed using, e.g., "192.168.1.125" as the IP address of the wireless communication terminal 1 and "255.255.255.0" as the subnet mask, and IP data communication using these addresses is enabled.

If the wireless communication terminal 1 should dynamically acquire the IP address and the like, data exchange for IP acquisition processing between the wireless communication terminal 1 and an IP setting apparatus (not shown) is executed via the wireless base station 2 as data exchange with an IP setting apparatus that exists on the network.

Next, the wireless communication terminal 1 connected to the wireless base station 2 performs an operation of searching for another wireless base station to detect a wireless base station of higher communication quality while keeping the connection to the wireless base station 2 without disconnecting it (step B3 and step C1). Note that the operation of searching for a wireless base station may be executed periodically or triggered by a specific event, for example, a decrease in the received signal level of the currently connected wireless base station 2 below a predetermined threshold.

Then, when the wireless communication terminal 1 acquires the search result while keeping the connection to the wireless base station 2 to be communicable (step B4 and step C2), the wireless communication terminal 1 extracts an identifier unique to a wireless base station from the search result (step C6), and transmits a presence confirmation request message to the wireless base station 3 based on the extracted identifier unique to the wireless base station (step B5 and step C7).

At this time, the network access control unit 105, subnet determination unit 106, and presence confirmation request transmitting unit 107 of the wireless communication terminal 1 operate in the following way.

The network access control unit 105 grasps the state in which the wireless connection processing is completed, and IP data communication is possible. When the wireless base station search result is acquired while IP data communication is possible (steps C1 and C2), the network access control unit 105 acquires an identifier unique to a wireless base station from the search result (step C6), and notifies the subnet determination unit 106 of the identifier unique to the wireless base station. For example, in IEEE:802.11, the identifier unique to the wireless base station is a BSSID sent from the wireless base station 3.

A wireless base station normally uses a MAC address given to its wireless interface as a BSSID. For example, if a BSSID sent from the wireless base station 3 is "00:00:4C:00:01:01", the MAC address is "00:00:4C:00:01:01". If a BSSID sent from the wireless base station 4 is "00:00:4C:00:02:01", the MAC address is "00:00:4C:00:02:01". Note that the network access control unit 105 can determine, based on the response from the subnet determination unit 106, whether the wireless base stations 3 and 4 belong to the same subnet as that of the currently connected wireless base station.

The network access control unit 105 may not to notify the subnet determination unit 106 of the identifier unique to the wireless base station if the identifier unique to the wireless base station is acquired from the wireless base station search result, and it is already known based a subnet determination result acquired by the subnet determination unit 106 that the wireless base station belongs to the same subnet.

Upon receiving the MAC address from the network access control unit 105, the subnet determination unit 106 requests the presence confirmation request transmitting unit 107 to transmit a presence confirmation request message, and simultaneously notifies it of the MAC address. After requesting the presence confirmation request transmitting unit 107 to transmit a presence confirmation request, the subnet determination unit 106 waits for a response from the presence confirmation response receiving unit 108. The subnet determination unit 106 has a time-out value, and starts time-out counting simultaneously with requesting the presence confirmation request transmitting unit 107 to transmit a presence confirmation request.

Upon receiving the presence confirmation request transmission request and the MAC address from the subnet determination unit 106, the presence confirmation request transmitting unit 107 generates data which should be exchanged in the data link layer, sets the received MAC address as the transmission designation and the MAC address of the wireless communication terminal itself as the transmission source, represents that the payload portion of the data link layer data is a presence confirmation request message, and includes the presence confirmation request message in the payload portion, and transmits the data to the wireless base station 2 via the communication control unit 101 (step B5 in FIG. 6 and step C7 in FIG. 7).

For example, upon receiving a MAC address "00:00:4C: 00:01:01" from the subnet determination unit 106, the MAC address is set as the destination. If the MAC address of the wireless communication terminal itself is "00:00:4C:00:00: 01", the MAC address is set as the transmission source. A thus generated presence confirmation request message is transmitted. Note that the presence confirmation request message may be held in advance.

The presence confirmation request message exchange in the data link layer has, for example, the structure shown in FIG. 4. The transmission source IP address in the IP header includes the IP address of the wireless communication terminal itself, for example, "192.168.1.125". The destination IP address includes an IP broadcast address, for example, "255.255.255.255". The value representing the type of IP payload portion is ICMP. The IP payload portion includes ICMP:Echo Request message.

At this time, the wireless base station 2, hub 5, router 6, and wireless base station 4 operate in the following way.

Upon receiving the presence confirmation request message from the wireless communication terminal 1, the wireless base station 2 determines the transfer destination from the transmission designation MAC address. When the wireless base station 2 is grasping the port to which the device having the MAC address is connected, it transfers the message to the port. When the wireless base station 2 is not grasping the port, it transfers the message to all ports. The port intends to be a physically or virtually connected interface unit. More specifically, the wireless base station 2 transfers the message to all wireless communication terminals connected to it or, in case of wired connection, transfers the message to the network 7.

For example, if the transmission designation MAC address is "00:00:4C:00:01:01", and data whose transmission source is "00:00:4C:00:01:01" has been received before, the wireless base station 2 transfers the message to the interface used for the reception. Otherwise, the message is transferred to all interfaces. That is, the message is sent to the hub 5 as well. This also applies to a case in which the transmission designation MAC address is "00:00:4C:00:02:01".

Upon receiving the data via the network 7, the hub 5 determines the transfer destination port, i.e., the network based on the destination MAC address, and transfers the received data. More specifically, when the presence confirmation request message is received from the wireless base station 2, and the hub 5 is grasping the transfer target network because it has previously received data whose transmission source is the MAC address designated as the destination, the presence confirmation request message is transferred to the network. Otherwise, the presence confirmation request message is transmitted to all networks. In this case, the presence confirmation request message is transferred to the network 8 and the router 6.

Upon receiving data via the network 7 or 8, the router 6 determines, based on the destination MAC address of the data, whether to process the data by itself. If the destination MAC address of the data is the MAC address of its own or a broadcast or multicast address, the router 6 analyzes the protocol of the network layer or transport layer, and transfers the data to an appropriate network. Otherwise, the router 6 simply discards the received data. More specifically, if the transmission designation MAC address of the data received via the network 7 or 8 is "00:00:4C:00:01:01", and the interface of the router has another MAC address, for example, "00:00:4C: 10:00:00", the received data is discarded without being transferred to the network 9. Note that this also applies to a case in which the transmission designation MAC address of the received data is "00:00:4C:00:02:01".

Upon receiving data via the network 8, the wireless base station 3 determines, based on the destination MAC address of the data, whether to process the data by itself. If the destination MAC address of the data is the MAC address of its own or a broadcast or multicast address, the wireless base station 3 identifies the frame type, transfers the data to a protocol stack adaptive to the type, and causes the protocol stack to execute processing. If the wireless base station 3 should not process the data by itself, the received data is simply discarded.

More specifically, if the transmission designation MAC address of the data received via the network 8 is "00:00:4C:00:01:01", the data is acquired by the wireless base station 3 and processed in accordance with the frame type because the MAC address the MAC address given to the interface of the wireless base station 3. In addition, since a broadcast address is designated as the transmission designation IP address of the presence confirmation request message, the data is handled as IP data to be processed by the wireless base station. On the other hand, if the transmission designation MAC address of the data received via the network 8 is "00:00:4C:00:02:01", the wireless base station 3 simply discards the received presence confirmation request message without processing it because the MAC address is not the MAC address given to the interface of the wireless base station 3.

Upon receiving the presence confirmation request message, the wireless base station 3 returns a presence confirmation response message to the transmission source. More specifically, an ICMP:Echo Reply message is transmitted to the wireless communication terminal 1 of the transmission source as a response to the ICMP:Echo Request message transmitted from the wireless communication terminal 1. At this time, the IP address "192.168.1.125" of the wireless communication terminal 1 that is the transmission source of the ICMP:Echo Request message is set as the transmission designation IP address of the ICMP:Echo Reply message. That is, the ICMP:Echo Reply message is sent to the wireless communication terminal 1 via the hub 5 and the wireless base station 2.

Note that the MAC address given to the interface of the wireless base station 3 is designated as the transmission source MAC address of the ICMP:Echo Reply message to be transmitted from the wireless base station 3. However, the MAC address may be a MAC address given to the wireless interface of the wireless base station 3, a MAC address given to the wired interface connected to a LAN or the like, or a MAC address given to another interface of the wireless base station 3.

Next, the wireless communication terminal 1 executes subnet determination in accordance with the reception result of the presence confirmation response message for the transmitted presence confirmation request message, thereby determining whether a wireless base station having the wireless identifier acquired from the search result exists in the same subnet as that of the wireless communication terminal 1 (step B6 and steps C8 to C10).

At this time, the communication control unit 101, presence confirmation response receiving unit 108, subnet determination unit 106, and network access control unit 105 of the wireless communication terminal 1 operate in the following way.

The communication control unit 101 transfers the data received from the wireless base station to the 108 and the like. More specifically, when a presence confirmation response message transmitted to the IP address "192.168.1.125" of the wireless communication terminal is received, the message is transferred to the presence confirmation response receiving unit 108.

The presence confirmation response receiving unit 108 determines whether the data received from the communication control unit 101 is the response to the presence confirmation request message transmitted by the presence confirmation request transmitting unit 107. If the analysis result indicates the presence confirmation response message, the subnet determination unit 106 is notified of the reception. If the analysis result does not indicate the presence confirmation response message, the data is directly discarded.

More specifically, a filtering rule is set such that when the presence confirmation request message is an ICMP:Echo Request message, the presence confirmation response receiving unit 108 analyzes whether the received message is an ICMP:Echo Reply message as the response to it. Upon receiving the ICMP:Echo Reply message, the presence confirmation response receiving unit 108 notifies the subnet determination unit 106 that the presence confirmation response message has been received. At this time, the received presence confirmation response message itself may be sent together with the notification representing the reception. Note that the filtering rule may be set such that when the presence confirmation request message is a message other than the ICMP:Echo Request message, the presence confirmation response receiving unit 108 analyzes whether a presence confirmation response message corresponding to it has been received. When the message has been received, the subnet determination unit 106 can be notified of it in a similar manner.

Upon receiving, from the presence confirmation response receiving unit 108, the notification representing that the presence confirmation response message has been received (step C8), the subnet determination unit 106 determines that the device having the MAC address previously received from the network access control unit 105 belongs to the same subnet as the subnet to which the wireless communication terminal 1 belongs (step C9), notifies the network access control unit 105 of it, and resets and stops the counter started before. More specifically, if the MAC address received from the network access control unit 105 is "00:00:4C:00:01:01", the presence confirmation response message from the wireless base station 3 is received. Hence, the subnet determination unit 106 determines that the wireless base station belongs to the same subnet, and notifies the network access control unit 105 of it.

On the other hand, if the MAC address received from the network access control unit 105 is "00:00:4C:00:02:01", neither the presence confirmation response message from the wireless base station 3 nor the Internet communication unit from the wireless base station 4 can be obtained.

When the counter started before exceeds the counter threshold held by it (step C8), the subnet determination unit 106 considers that no presence confirmation response message has been received. The subnet determination unit 106 determines that the device having the MAC address previously received from the network access control unit 105 belongs to a subnet different from the subnet to which the wireless communication terminal 1 belongs (step C10), notifies the network access control unit 105 of it, and resets and stops the counter started before. Note that the counter threshold may be preset in the subnet determination unit 106 or stored in a parameter storage unit (not shown) and read out from it.

The network access control unit 105 can know, based on the subnet determination result from the subnet determination unit 106, whether the device having the MAC address previously requested of the subnet determination unit 106 belongs to the same subnet as the subnet to which the wireless communication terminal 1 belongs.

Note that storing the subnet determination result from the subnet determination unit 106 for the requested MAC address allows the network access control unit 105 to inhibit repetitious subnet determination for a wireless base station in the wireless base station search result, which has already undergone the subnet determination. Alternatively, the subnet determination may be executed newly when the connection is switched to a wireless base station that is different from the wireless base station to which the wireless communication terminal 1 is currently connected.

Effects of First Exemplary Embodiment

As described above, according to this exemplary embodiment, the layer 2 address of a new wireless base station is acquired from information transmitted from the wireless base station currently connected via the wireless communication interface. A presence confirmation request message is generated using the layer 2 address as the destination address, and transmitted via the currently connected wireless base station. Upon receiving a presence confirmation response message for the presence confirmation request message, it is determined that the new wireless base station belongs to the same subnet as that of the currently connected wireless base station.

This allows the wireless communication terminal to determine before handover whether a wireless base station as a handover candidate is connected to the same subnet as that of the currently connected wireless base station without requiring an information server that holds information about the wireless base stations in advance.

It is therefore possible to prevent handover which requires IP address change after the handover from being executed with priority over handover without IP address change. In addition, wasteful IP address setting processing after the handover can be omitted.

Additionally, according to this exemplary embodiment, a MAC address as an identifier unique to a wireless base station sent from the new wireless base station in the data link layer is acquired via the wireless base station currently connected to the wireless communication terminal, and set as the destination of data link layer data, and the presence confirmation request message is transmitted using an IP broadcast address.

This makes it possible to transmit the presence confirmation request message to the new wireless base station without knowing the IP address in advance.

Even when the transmission source MAC address of the presence confirmation response message is different from the transmission designation MAC address of the presence confirmation request message, the presence confirmation response can be associated with the presence confirmation request.

Hence, the wireless communication terminal 1 can execute identical subnet determination between the wireless communication terminal and the wireless base station without requiring a change to the wireless communication protocol, and implement the processing without any influence on other devices on the network.

Furthermore, in this exemplary embodiment, the presence confirmation request message transmitted from the wireless communication terminal complies with a protocol generally provided in a device having a communication function. Hence, application to an existing wireless communication system is possible without requiring any special function in the wireless base station and the relay apparatus.

For this reason, since only the wireless communication terminal needs to support the system, the introduction cost can be suppressed. It is not necessary at all to independently require a server that holds information about wireless base stations, as a matter of course.

Second Exemplary Embodiment

Figure 8:
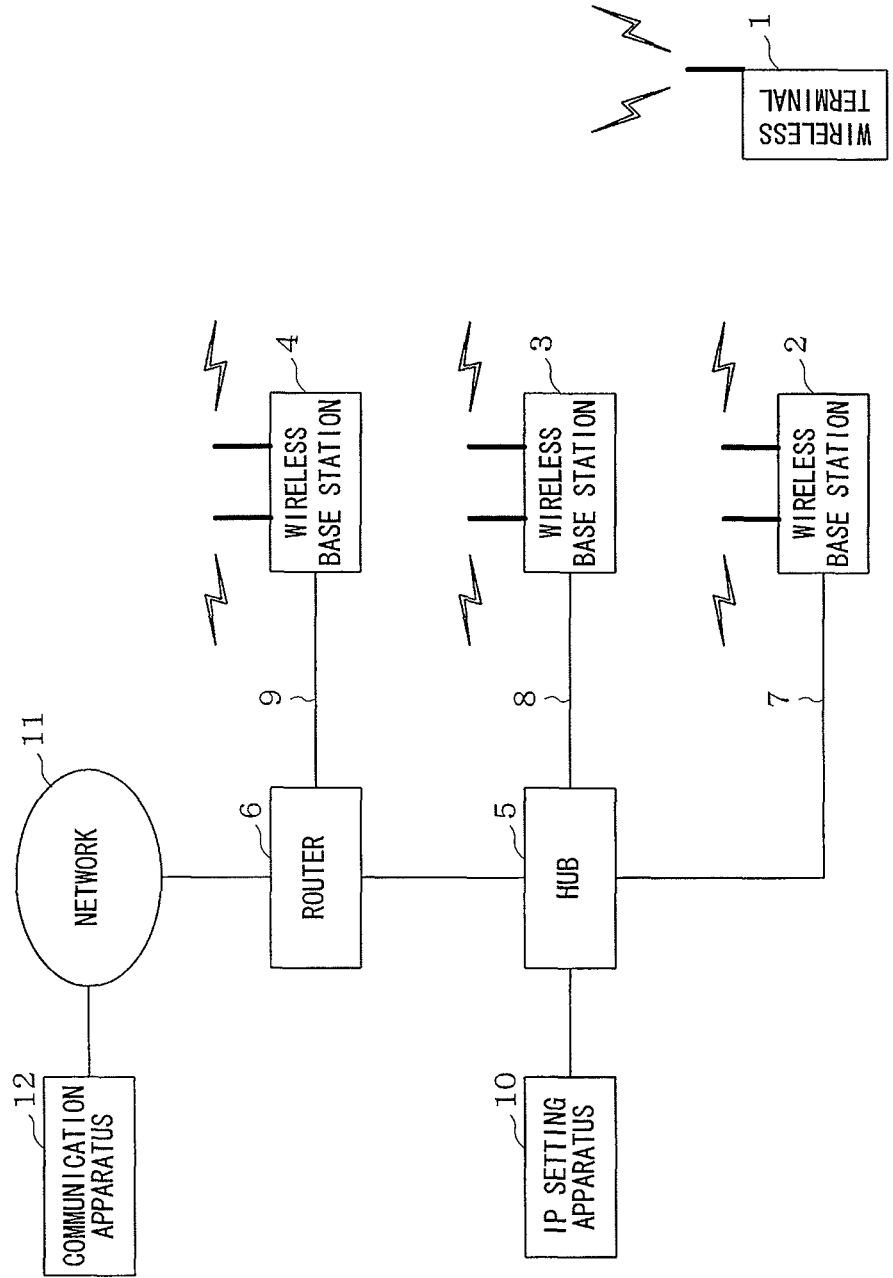
FIG. 8 is a block diagram showing the arrangement of a wireless communication system according to the second exemplary embodiment of the present invention.

A wireless communication system according to the second exemplary embodiment of the present invention will be described next with reference to FIG. 8. FIG. 8 is a block diagram showing the arrangement of the wireless communication system according to the second exemplary embodiment of the present invention. The same reference numerals as in FIG. 2 denote the same or similar parts in FIG. 8.

The wireless communication system according to this exemplary embodiment further includes an IP setting apparatus 10 connected to a hub 5, a network 11, and a communication apparatus 12 connected to the network 11 in addition to the arrangement of the wireless communication system according to the first exemplary embodiment shown in FIG. 2.

In this exemplary embodiment, the IP setting apparatus 10 has a function of managing information such as an IP address to be used on the network, and sending the information to an apparatus for performing communication using an IP protocol. More specifically, the IP setting apparatus 10 has a function of starting exchange based on a request from a wireless communication terminal 1, and executing exchange with the wireless communication terminal 1, thereby sending, to the wireless communication terminal 1, information necessary for IP data communication, i.e., the IP address, subnet mask, default gateway, and DNS server address of the wireless communication terminal 1. For example, the IP setting apparatus 10 may be formed from a DHCP server. Note that the IP setting apparatus 10 may exist in the same subnet as that of the wireless communication terminal 1, or be installed in a different subnet by installing an apparatus (not shown) for connecting the wireless communication terminal 1 and the IP setting apparatus 10 in the same subnet as that of the wireless communication terminal 1.

In this exemplary embodiment, the communication apparatus 12 has a function of communicating using an IP protocol and, more specifically, a function of exchanging data with the wireless communication terminal 1 via the network 11 based on an IP protocol. For example, the communication apparatus 12 has a function of performing speech communication on an IP protocol, and may have a function of performing speech communication with the wireless communication terminal 1. The communication apparatus 12 has a function of performing video distribution on an IP protocol, and may have a function of performing video distribution to the wireless communication terminal 1. Note that the communication apparatus 12 can be connected to any device as long as it can communicate with a device connected to the network 11.

Figure 9:
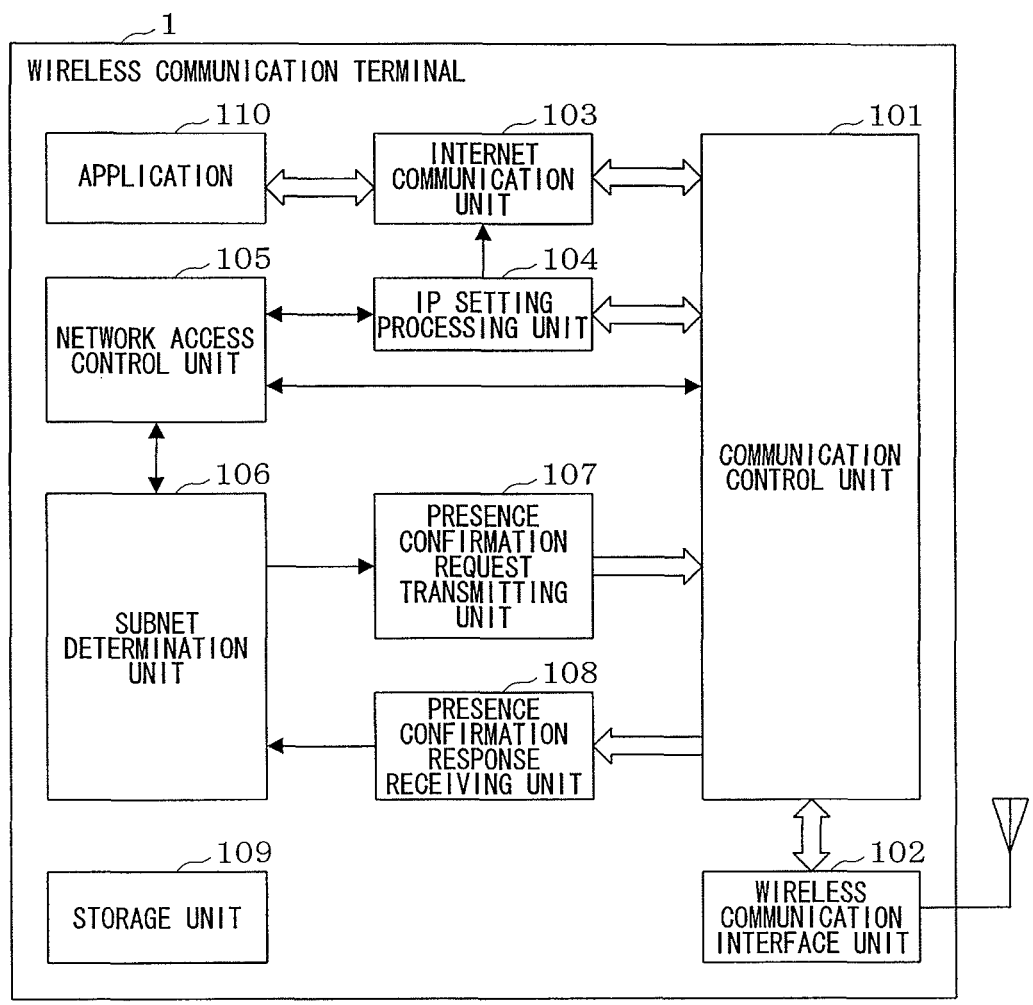
FIG. 9 is a block diagram showing the arrangement of a wireless communication terminal according to the second exemplary embodiment of the present invention.

The arrangement of a wireless communication terminal according to the second exemplary embodiment of the present invention will be described next with reference to FIG. 9. FIG. 9 is a block diagram showing the arrangement of the wireless communication terminal according to the second exemplary embodiment of the present invention. The same reference numerals as in FIG. 3 denote the same or similar parts in FIG. 9.

The wireless communication terminal 1 according to this exemplary embodiment is the same as that of the first exemplary embodiment shown in FIG. 3 except that the terminal further includes an application 110, and the functions of a network access control unit 105 and an IP setting processing unit 104 partially change.

The application 110 is a communication application program based on an IP protocol. Although the type of the application 110 is not limited, the processing is particularly effective for, e.g., a speech communication application, TV phone application, and video reception application that need real-time processing. Note that when an Internet communication unit 103 is ready for IP data transmission/reception, the application 110 can exchange IP data via the Internet communication unit 103.

Note that the functions of the network access control unit 105 and the IP setting processing unit 104 are partially different from those of the units in the wireless communication terminal 1 according to the first exemplary embodiment in points to be described next.

The network access control unit 105 of this exemplary embodiment has a function of switching connection from a wireless base station 2 to another wireless base station 3 or 4, and a function of switching notification contents for the IP setting processing unit 104 after switching to the wireless base station 3 in accordance with a subnet determination result from a subnet determination unit 106 for the wireless base station 3 in the search result, which has already undergone the subnet determination, in addition to the functions in the first exemplary embodiment. More specifically, unlike the arrangement of the first exemplary embodiment, the network access control unit 105 has a function of selecting to connect to another wireless base station 3 based on a wireless base station search result acquired during connection to the wireless base station 2, a function of, upon selecting to switch to another wireless base station 3, notifying a communication control unit 101 that the current wireless base station 2 is to be disconnected, a function of simultaneously notifying the IP setting processing unit 104 to stop IP communication, a function of requesting the communication control unit 101 to switch to the selected wireless base station 3, and a function of, upon detecting the completion of connection to the new base station 3 determining, in accordance with the subnet determination result for the newly connected wireless base station 3 which has already undergone the subnet determination, whether to resume IP data communication by continuously using IP address information and the like or by newly setting IP address information and the like, and notifying the IP setting processing unit 104 of it.

The IP setting processing unit 104 of this exemplary embodiment has a function of receiving, from the network access control unit 105, an IP data communication start request and continuous use information for IP address information and the like, and a function of dynamically changing whether to reset the IP address information and the like in accordance with the received continuous use information, in addition to the functions in the first exemplary embodiment.

More specifically, unlike the arrangement of the first exemplary embodiment, the IP setting processing unit 104 has a function of, upon receiving the IP data communication start request from the network access control unit 105 together with a notification representing continuous use of IP address information and the like, controlling the Internet communication unit 103 to immediately resume IP data communication using previously used IP address information and the like, and upon receiving the IP data communication start request from the network access control unit 105 together with a notification representing reset of IP address information and the like, controlling the Internet communication unit 103 to reset information of the IP address and the like in the Internet communication unit 103 based on acquired information as in normally setting an IP address and the like first and then resume IP data communication.

Note that the IP address information and the like may be used continuously either by setting, in an Internet control unit, IP address information and the like used in previous communication and held in the IP setting processing unit 104, or by keeping the set IP address information and the like stored in the Internet communication unit 103 even upon receiving an IP data communication stop request.

The wireless communication terminal 1 implements the processes of the above-described units by causing a CPU 401 to load programs stored in a storage unit 109 to a main storage unit 402 and execute them, as in the first exemplary embodiment.

Operation of Second Exemplary Embodiment

Figure 10:
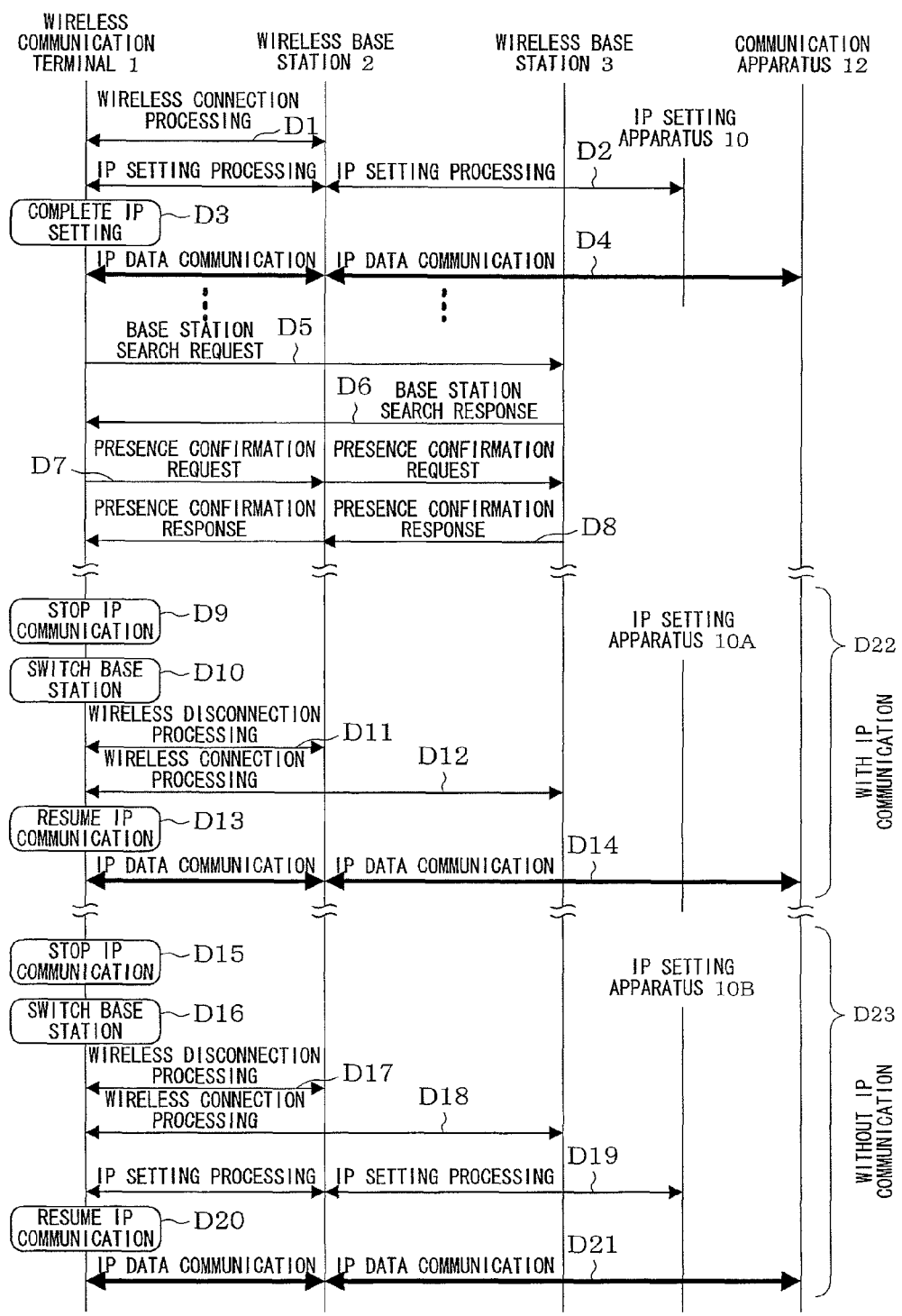
FIG. 10 is a sequence chart showing the operation of the wireless communication system according to the second exemplary embodiment of the present invention.
Figure 11:
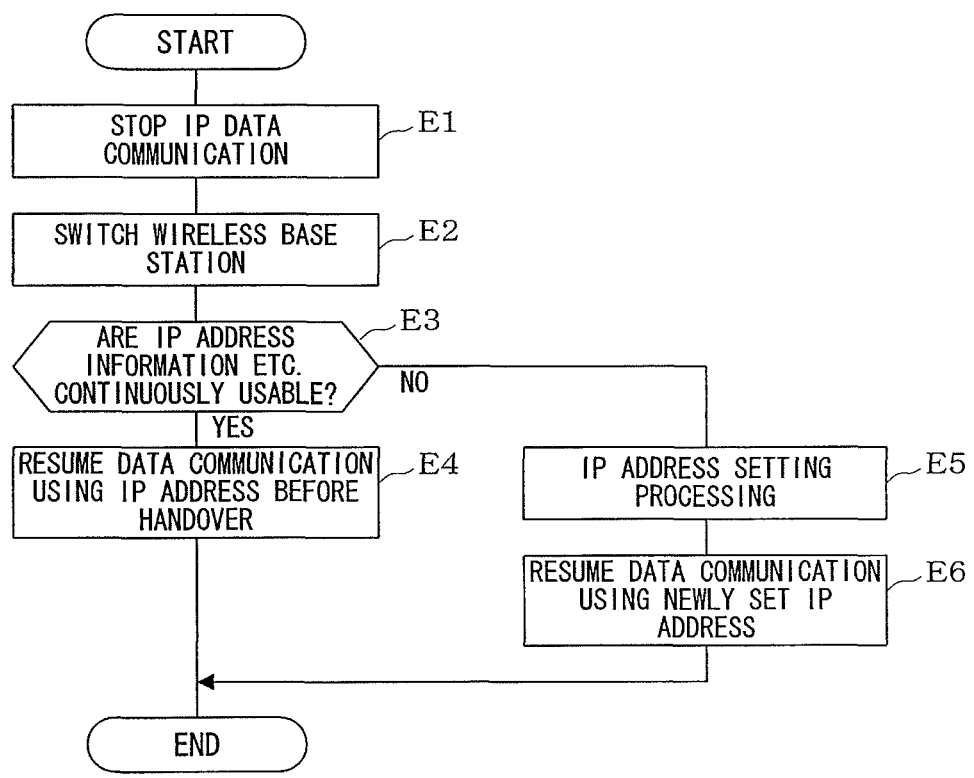
FIG. 11 is a flowchart illustrating the operation of the wireless communication terminal according to the second exemplary embodiment of the present invention.

The operations of the wireless communication system and wireless communication terminal according to the second exemplary embodiment of the present invention will be described next with reference to FIGS. 10 and 11. FIG. 10 is a sequence chart showing the operation of the wireless communication system according to the second exemplary embodiment of the present invention. FIG. 11 is a flowchart illustrating the operation of the wireless communication terminal according to the second exemplary embodiment of the present invention. Points different from the first exemplary embodiment will mainly be explained below.

Note that the processes of this exemplary embodiment are implemented by causing the CPU 401 of the wireless communication terminal 1 to load the programs stored in the storage unit 109 to the main storage unit 402 and execute them, as in the first exemplary embodiment.

Referring to FIG. 10, first, the wireless communication terminal 1 performs connection negotiation with the wireless base station 2, thereby enabling data communication with a device on the network via the wireless base station 2, as in the first exemplary embodiment (step D1).

When the connection negotiation with the wireless base station 2 is completed, the wireless communication terminal 1 acquires settings of an IP address and the like by exchange with the IP setting apparatus 10 to prepare for data communication based on an IP protocol (step D2). Note that the operation at this time is the same as when dynamically acquiring information of the IP address and the like in the first exemplary embodiment. More specifically, setting of the dynamically acquired information of the IP address and the like is completed, and the terminal is ready for IP data communication (step D3). Note that at this time, the IP setting processing unit 104 of the wireless communication terminal 1 may hold the information of the IP address and the like dynamically acquired and set in the Internet communication unit 103.

Next, when the wireless communication terminal 1 becomes ready for IP data communication, it starts data communication with the communication apparatus 12 (step D4). For example, if the application 110 in the wireless communication terminal 1 is a speech communication application, and the communication apparatus similarly includes a speech communication application, speech communication on an IP protocol starts between the wireless communication terminal 1 and the communication apparatus (step D4). Note that the data communication between the wireless communication terminal 1 and the communication apparatus is applicable not only to the speech communication application but also to a TV phone application. The wireless communication terminal 1 may have a video reception application, and the communication apparatus may have a video distribution application. Although the type of the application is not particularly limited, the processing is especially effective for an application that needs real-time processing.

At this time, the application 110 in the wireless communication terminal 1 exchanges IP data for speech communication with the communication apparatus via the Internet communication unit 103, thereby implementing speech communication. The IP address of the wireless communication terminal 1 used at this time is dynamically acquired by the IP setting processing unit 104 and set in the Internet communication unit 103 in advance. For example, when the IP address of the wireless communication terminal 1 is "192.168.1.125", the subnet mask is "255.255.255.0", and the IP address of the router is "192.168.1.254", "192.168.1.254" is set as the default gateway.

Note that the data communication started here between the wireless communication terminal 1 and the communication apparatus 12 is continuously performed from then on.

Next, while keeping the IP data communication with the communication apparatus 12 via the wireless base station 2, the wireless communication terminal 1 performs an operation of searching for another wireless base station to detect a wireless base station of higher communication quality while keeping the connection to the wireless base station 2 without disconnecting it (step D5), as in the first exemplary embodiment.

As in the first exemplary embodiment, the wireless communication terminal 1 acquires the search result while keeping the connection to the wireless base station 2 (step D6), extracts an identifier unique to a wireless base station from the search result and transmits a presence confirmation request message to the wireless base station based on the extracted identifier unique to the wireless base station (step D7), and executes subnet determination in accordance with the reception result of a presence confirmation response message for the transmitted presence confirmation request message, thereby determining whether the wireless base station having the wireless identifier acquired from the search result exists in the same subnet as that of the wireless communication terminal 1 (step D8).

More specifically, if the MAC address sent from the network access control unit 105 is "00:00:4C:00:01:01", the subnet determination unit 106 of the wireless communication terminal 1 receives a presence confirmation response message from the wireless base station 3. The subnet determination unit 106 determines that the wireless base station belongs to the same subnet, and notifies the network access control unit 105 of it. On the other hand, if the MAC address sent from the network access control unit 105 is "00:00:4C:00:02:01", neither the presence confirmation response message from the wireless base station 3 nor the presence confirmation response message from the wireless base station 4 is obtained. The subnet determination unit 106 determines by time-out processing that the wireless base station belongs to a different subnet, and notifies the network access control unit 105 of it.

At this time, upon acquiring the subnet determination result for the MAC address requested of the subnet determination unit 106, the network access control unit 105 of the wireless communication terminal 1 determines whether to continuously use information of the IP address and the like for the wireless base station having the MAC address of the acquired result in the following way. More specifically, upon receiving the subnet determination result for the MAC address requested of the subnet determination unit 106, which represents that the subnet is the same, the network access control unit 105 determines that IP address continuation information representing that the information of the IP address and the like used in communication with the currently connected wireless base station should continuously be used even after switching the connection from the currently connected wireless base station to the wireless base station having the MAC address is on, and stores the IP address continuation information together with the wireless base station search result.

On the other hand, upon receiving the subnet determination result for the MAC address requested of the subnet determination unit 106, which represents that the subnet is different, the network access control unit 105 determines that IP address continuation information is off for the wireless base station having the MAC address, and stores the IP address continuation information together with the wireless base station search result. For example, the IP address continuation information is stored as on for the wireless base station 3 having the MAC address "00:00:4C:00:01:01". The IP address continuation information is stored as off for the wireless base station 4 having the MAC address "00:00:4C:00:02:01".

Upon selecting to switch the connection to another wireless base station based on the wireless base station search result, the wireless communication terminal 1 starts wireless base station switching processing. For example, the wireless communication terminal 1 that is being connected to the wireless base station 2 selects to switch the connection to the wireless base station 3 or 4 (step D22 or D23). Note that when the wireless communication terminal 1 determines whether to switch the wireless base station, the switching processing may be triggered by a decrease in the received field strength of the currently connected wireless base station 2 below a threshold held in advance, detection of a wireless base station having a received field strength higher than that of the currently connected wireless base station 2, or any other event which is not particularly limited.

When the wireless base station switching processing starts, the wireless communication terminal 1 first stops IP data communication (step D9 or D15), and executes wireless disconnection processing of the currently connected wireless base station 2 (steps D10 and D11 or D16 and D17), and wireless connection processing of the wireless base station 3 or 4 of the switching destination (step D12 or D18). Note that the wireless disconnection processing of the currently connected wireless base station (step D11 or D17) may be omitted.

Note that IP data communication that is being performed between the wireless communication terminal 1 and the communication apparatus 12 is interrupted when the wireless communication terminal 1 has stopped IP data communication or has been disconnected from the wireless base station 2. For example, during speech communication, the voice is interrupted. During a TV phone call, the video stops, and the voice is interrupted.

At this time, the network access control unit 105 and the IP setting processing unit 104 of the wireless communication terminal 1 operate in the following way.

Upon determining to switch the wireless base station, the network access control unit 105 requests the IP setting processing unit 104 to stop IP data communication (step E1), requests the communication control unit 101 to execute disconnection processing of the currently connected wireless base station, and controls to execute connection negotiation with the new wireless base station of the switching destination (step E2). For example, disconnection processing of the currently connected wireless base station 2 is executed, and connection negotiation with the wireless base station 3 or 4 is executed, thereby enabling data communication via the wireless base station 3 or 4.

The IP setting processing unit 104 controls the Internet communication unit 103 based on the IP data communication stop request from the network access control unit 105 (step E1). Note that the IP data communication may be stopped while keeping the information of the IP address and the like set in the Internet communication unit 103 or while causing the IP setting processing unit 104 to hold the information of the IP address and the like set in the Internet communication unit 103.

When the connection negotiation with the new wireless base station 3 or 4 is completed, and IP setting processing starts to prepare for data communication based on an IP protocol, the wireless communication terminal 1 determines, based on the already acquired on/off state of IP address continuation information for the wireless base station 3 or 4, whether to reset the information of the IP address and the like to be used in IP data communication via the wireless base station 3 or 4 after switching, and then executes IP setting processing and resumes the IP data communication. More specifically, if the IP address continuation information for the newly connected wireless base station 3 is on, the IP data communication is immediately resumed using the information of the IP address and the like used before the wireless base station switching (steps D13 and D14).

On the other hand, if the IP address continuation information for the newly connected wireless base station 4 is off, settings of an IP address and the like are acquired by exchange with the IP setting apparatus, as in the first connection (step D19), and the IP data communication is resumed after resetting using the acquired information (steps D20 and D21). Note that is the on/off information of the IP address continuation information is not present, the information is regarded as off.

At this time, the network access control unit 105, IP setting processing unit 104, and Internet communication unit 103 of the wireless communication terminal 1 operate in the following way.

Upon receiving, from the communication control unit 101, a notification representing that the connection processing of the new wireless base station is completed, the network access control unit 105 does settings necessary for IP data communication in the IP setting processing unit 104, and notifies it of the IP address continuation information previously acquired for the wireless base station. The network access control unit 105 receives a notification representing that the settings are completed, and grasps that the terminal is ready for IP data communication.

Upon receiving a request to do settings necessary for IP data communication, the IP setting processing unit 104 operates in the following way based on the IP address continuation information sent together from the network access control unit 105 (step E3). More specifically, when the IP address continuation information in the ON state is received from the network access control unit 105, the IP setting processing unit 104 controls the Internet communication unit 103 to immediately resume the IP data communication using the information of the IP address and the like used so far (step E4).

For example, IP data communication is immediately resumed using the IP address "192.168.1.125", subnet mask "255.255.255.0", and default gateway "192.168.1.254" of the wireless communication terminal 1 used so far. Note that this can also be implemented by setting the information of the IP address and the like held by the IP setting processing unit 104 again in the Internet communication unit 103. Alternatively, IP data communication may be stopped without deleting the information of the IP address and the like in the Internet communication unit 103, and resumed using the information of the IP address and the like used so far based on an IP data communication resumption request from the IP setting processing unit 104.

On the other hand, when the IP address continuation information in the OFF state is received from the network access control unit 105, the IP setting processing unit 104 acquires the settings of the IP address and the like by exchange with the IP setting apparatus as in setting the information for the first time (step E5), and sets not the information of the IP address and the like used so far but the acquired values in the Internet communication unit 103, thereby resuming the IP data communication (step E6). Note that the operation at this time is the same as in dynamically acquiring information of an IP address and the like in the first exemplary embodiment. That is, setting of the dynamically acquired information of the IP address and the like is completed, and the terminal becomes ready for IP data communication.

As a result, for example, an IP address "192.168.55.125", a subnet mask "255.255.255.0", and a default gateway "192.168.55.254" are set in the wireless communication terminal 1, and the IP data communication is resumed using the IP address different from that before wireless base station switching. Note that the reacquired IP address may eventually be the same as that used before wireless base station switching.

The Internet communication unit 103 completes the setting to execute IP data communication based on the settings from the IP setting processing unit 104. When the setting is completed, IP data communication via the communication control unit 101 is enabled (step E4 or E6). If the information of the IP address and the like are already set, and IP data communication is interrupted in the IP data communication enable state based on the request from the IP setting processing unit 104, the IP data communication may immediately be resumed using the information of the IP address and the like used so far upon receiving the IP data communication resumption request from the IP setting processing unit 104.

More specifically, for example, when being connected to the wireless base station 2, the wireless communication terminal 1 stores the IP address continuation information as on for the wireless base station 3 having a MAC address "00:00: 4C:00:01:01". After switching from the wireless base station 2 to the wireless base station 3, the wireless communication terminal 1 immediately resumes the IP data communication by continuously using "192.168.1.125" used for the connection to the wireless base station 2 (step D22).

On the other hand, for example, when being connected to the wireless base station 2, the wireless communication terminal 1 stores the IP address continuation information as off for the wireless base station 4 having a MAC address "00:00: 4C:00:02:01". After switching from the wireless base station 2 to the wireless base station 4, the wireless communication terminal 1 resumes the IP data communication by resetting, for example, "192.168.2.126" newly acquired after connecting to the wireless base station 4, instead of using "192.168.1.125" used for the connection to the wireless base station 2 (step D23).

Hence, when the wireless communication terminal 1 resumes the IP data communication, the IP data communication that is being performed by the application 110 is resumed (step D14 or D21). For example, when the wireless communication terminal 1 is performing speech communication with the communication apparatus 12, the speech communication is resumed. When a TV phone call is being performed, the TV phone call is resumed. When video reception is being performed, the video reception is resumed.

Note that the application 110 in the wireless communication terminal 1 is not limited to this. Although no detailed explanation will be made here, some kind of application 110 may need control signal exchange with the communication apparatus 12 when the IP address of the wireless communication terminal 1 has been changed upon wireless base station switching. However, such control signals can also be included in IP data communication. Resumption of IP data communication intends to include such control signals here.

Note that in this exemplary embodiment, dynamic IP acquisition has been described. The present invention is not limited to this, but is particularly useful in the dynamic IP acquisition.

This exemplary embodiment can be combined with the above-described first exemplary embodiment.

Effects of Second Exemplary Embodiment

As described above, according to this exemplary embodiment, upon determining based on the subnet determination result of the subnet determination unit that the subnet is the same, it is determined to continuously use the IP address information. Upon determining that the subnet is different, it is determined to reacquire the IP address information. IP data communication is interrupted immediately before switching the wireless base station. After completing wireless base station switching, if the IP address information is to be used continuously, the IP data communication is immediately resumed using the IP address information used before the wireless base station switching. If the IP address information is to be reset, the IP data communication is resumed using IP address information reacquired after the wireless base station switching.

It is therefore possible to confirm, before wireless base station switching, whether IP address information needs to be reacquired after switching. If the wireless communication terminal 1 is expected to belong to the same subnet before and after the wireless base station switching, IP data communication can be resumed immediately without reacquiring the information of the IP address and the like.

For this reason, in a state in which the wireless communication terminal 1 needs to dynamically acquire the information of the IP address and the like every time it is connected to a wireless base station, even when wireless base station switching has occurred during data communication, degradation in the communication quality can be suppressed as compared to the prior art.

In addition, since the wireless communication terminal 1 is configured to, before wireless base station switching, determine IP setting acquisition after wireless base station switching, confirmation processing by data communication via the wireless base station need not be performed after wireless base station switching.

Hence, the wireless communication terminal 1 can eliminate the influence on the network which may be caused by communication using an IP address whose availability after wireless base station switching is indeterminable.

In this exemplary embodiment, the wireless communication terminal 1 determines whether to execute IP address setting acquisition processing based on IP address continuation information based on a subnet determination result before executing IP address setting acquisition processing based on a preset IP address setting acquisition method.

For this reason, it is usable independently of the IP address setting acquisition method preset in the wireless communication terminal 1. It is therefore possible to obtain the effect independently of the IP address setting acquisition method preset in the wireless communication terminal 1.

It is theoretically possible to obtain the same effects as in this exemplary embodiment by setting IP address continuation information in advance for each of round-robin combinations of all wireless base stations that can be connected to the wireless communication terminal 1. However, it can readily be imagined that implementing this is not realistic because it is assumed to be necessary to input all combinations in advance, change the settings of all combinations in case of, for example, a change in the settings of one wireless base station, and cause the wireless communication terminal 1 to cope with addition of settings of a new wireless base station. In this exemplary embodiment, the settings can dynamically be implemented without requiring presetting, and the user or administrator need not do difficult settings.

The wireless communication terminal 1 may hold a different IP address setting acquisition method for each of the plurality of wireless base stations to be connected. In this case as well, whether to execute IP address setting acquisition processing is determined based on IP address continuation information based on a subnet determination result.

It is therefore possible to use wireless base stations even when, for example, an IP address setting acquisition method which can change for a plurality of ESSIDs is set in the wireless communication terminal 1. Hence, the effect can be obtained independently of whether the EESID changes or remains unchanged before and after wireless base station switching.

Note that when the wireless communication terminal 1 holds a different IP address setting acquisition method for each of the plurality of wireless base stations, the IP setting processing unit 104 of the wireless communication terminal 1 may hold information representing whether to receive IP address continuation information in addition to the information about the IP address setting acquisition method.

More specifically, when the IP setting processing unit 104 is set to receive IP address continuation information, the above-described operation is performed. However, when the IP setting processing unit 104 is set not to receive IP address continuation information, information of an IP address and the like are set based on the IP address setting acquisition method held in the IP setting processing unit 104 interpedently of the presence/absence of IP address continuation information from the network access control unit 105.

This makes it possible to change the IP address continuation operation according to this exemplary embodiment for each of the setting information held in the wireless communication terminal 1 for the plurality of wireless base stations. Note that the processing of determining whether to receive IP address continuation information may be performed by the network access control unit 105. In this case, at the point of time the wireless base station search result has been received, the network access control unit 105 may inhibit execution of the subnet determination processing based on IP address continuation information contained in the setting information of each wireless base station that is set in advance, thereby inhibiting IP address continuation.

The wireless communication terminal 1 may execute the processing based on IP address setting acquisition processing set in the wireless communication terminal 1 in advance before the IP address setting acquisition processing determination based on IP address continuation information. Alternatively, if IP address setting acquisition information set in the wireless communication terminal 1 in advance indicates dynamically acquiring the information, the IP address continuation information may be reflected.

This makes it possible to use information of a specific IP address and the like according to user's intention when the wireless communication terminal 1 should use a preset IP address and the like for a predetermined wireless base station.

In this exemplary embodiment, the wireless communication terminal 1 dynamically acquires an IP address using DHCP. In IPv6, the automatic address setting function of IPv6 may be used. More specifically, the router transmits an RA (Router Advertisement) including network address information periodically or in response to a request from the terminal. The wireless communication terminal 1 generates an IP address based on prefix information contained in the RA and a unique interface ID of the terminal, and to confirm the uniqueness of the generated IP address, checks whether a device having the same IP address exists on the network so that the IP address of the wireless communication terminal 1 is finally determined.

This allows to omit the automatic address setting function of IPv6 based on IP address continuation information, like DHCP, and thus decrease data loss in switching the wireless base station.

Additionally, in this exemplary embodiment, when handover control is performed to temporarily disconnect the wireless communication terminal from the wireless base station connected before the handover and then subsequently connect the terminal to the same wireless base station again, the subnet determination unit 106 may determine that the subnet is the same, and the network access control unit 105 may determine to continuously use the IP address information.

Third Exemplary Embodiment

Figures 12, 13:
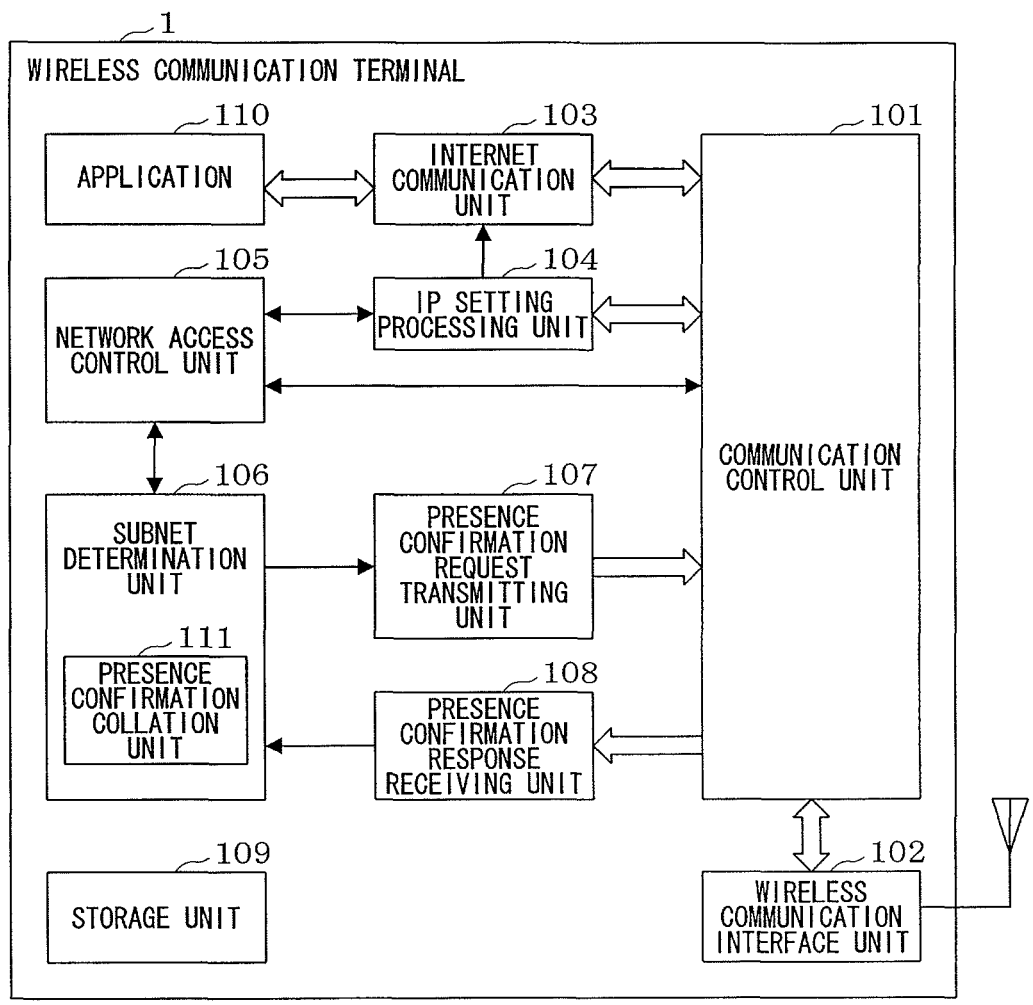
FIG. 12 is a block diagram showing the arrangement of a wireless communication terminal according to the third exemplary embodiment of the present invention.
FIG. 13 is an explanatory view showing sets of addresses and identifiers.

A wireless communication terminal according to the third exemplary embodiment of the present invention will be described next with reference to FIG. 12. FIG. 12 is a block diagram showing the arrangement of the wireless communication terminal according to the third exemplary embodiment of the present invention. The same reference numerals as in FIG. 9 denote the same or similar parts in FIG. 12.

A wireless communication terminal 1 according to this exemplary embodiment is the same as that of the second exemplary embodiment shown in FIG. 9 except that a subnet determination unit 106 includes a presence confirmation collation unit 111 to be used to identify a presence confirmation request and a presence confirmation response corresponding to it, and the functions of a network access control unit 105, the subnet determination unit 106, a presence confirmation request transmitting unit 107, and a presence confirmation response receiving unit 108 partially change.

FIG. 13 is an explanatory view showing sets of addresses and identifiers. The manner the presence confirmation collation unit 111 stores the sets of addresses and identifiers is illustrated.

The presence confirmation collation unit 111 included in the subnet determination unit 106 has a function to be used to identify a presence confirmation request acquired from the presence confirmation response receiving unit 108 and a presence confirmation response corresponding to it. More specifically, the presence confirmation collation unit 111 has a function of determining an identifier to uniquely identify a device together with a MAC address and storing them as a set (F1 in FIG. 13), a function of sending a MAC address and a corresponding identifier together when requesting the presence confirmation request transmitting unit 107 to transmit a presence confirmation request, a function of acquiring a presence confirmation response and an identifier from the presence confirmation response receiving unit 108, and a function of comparing corresponding MAC addresses based on the identifiers.

Note that the presence confirmation collation unit 111 may delete a stored set of a MAC address and an identifier upon receiving a response from the presence confirmation response receiving unit 108 or time-out in the subnet determination unit 106. This allows to newly use the canceled identifier. That is, it may be possible to select a uniquely identifiable value from currently valid identifiers.

Additionally, the functions of the network access control unit 105, subnet determination unit 106, presence confirmation request transmitting unit 107, and presence confirmation response receiving unit 108 are partially different from those of the units in the wireless communication terminal 1 according to the second exemplary embodiment in points to be described next.

The network access control unit 105 of this exemplary embodiment is different from those of the first and second exemplary embodiments in that the unit further has a function of simultaneously requesting a plurality of subnet determinations for an identifier unique to a wireless base station acquired from a wireless base station search result, a function of accordingly acquiring a plurality of determination results simultaneously, and a function of switching the connection to one wireless base station selected from wireless base stations corresponding to the acquired determination results based on a predetermined wireless base station selection condition.

More specifically, the network access control unit 105 has a function of, after requesting the subnet determination unit 106 to execute subnet determination for a MAC address, continuously requesting subnet determination for another MAC address before receiving the determination result, a function of accordingly acquiring results associated with MAC addresses, thereby identifying the corresponding MAC addresses, and a function of, when switching the wireless base station connected to the wireless communication terminal 1, selecting a wireless base station belonging to the same subnet with priority over wireless base stations belonging to different subnets based on the wireless base station search result and the subnet determination result.

Note that when sending requests and acquiring results, the network access control unit 105 may send a plurality of requests to the subnet determination unit 106 simultaneously, and acquire a plurality of results simultaneously. Alternatively, the network access control unit 105 may sequentially send requests and sequentially acquire results in order of obtaining determination results. These arrangements may be combined.

The subnet determination unit 106 of this exemplary embodiment is different from those of the first and second exemplary embodiments in that the unit has a function of simultaneously executing a plurality of subnet determinations. More specifically, the subnet determination unit 106 has a function of performing determination for each MAC address using the presence confirmation collation unit 111, and a function of notifying the network access control unit 105 of a pair of a MAC address and a subnet determination result corresponding to the MAC address.

The time-out value held by the subnet determination unit 106 may be prepared for each MAC address used in subnet determination. This enables to execute the determinations of MAC addresses at different timings and thus cope with separate requests. The subnet determination unit 106 may be able to simultaneously receive a plurality of requests from the network access control unit 105 and send results to the network access control unit 105 in order of obtaining subnet determination results. A plurality of results may be sent simultaneously.

The presence confirmation request transmitting unit 107 of this exemplary embodiment is different from those of the first and second exemplary embodiments in that the unit further has a function of, upon receiving a presence confirmation request transmission notification, inserting an identifier received together with a MAC address into the presence confirmation request message to be transmitted.

More specifically, the presence confirmation request transmitting unit 107 has a function of inserting an identifier to an appropriate portion of a presence confirmation request message for which a response formed from the same data as that of the presence confirmation request is expected.

For example, when the presence confirmation request message is an ICMP:Echo Request message, the function is implemented by the identifier field (A3-6 in FIG. 4) of the ICMP:Echo Request message. It may be implemented by the field (A3-7 in FIG. 4) representing the sequence number. A portion other than the field indicating the identifier or sequence number is also usable. The payload portion of an ICMP:Echo Request message is also usable (A3-8 in FIG. 4). That is, the function can be implemented without any limitation of size or number in the field indicating the identifier or sequence number. Note that although an ICMP:Echo Request message has been exemplified here, the present invention is not limited to this. The message is not particularly limited if the same presence confirmation response as that for an ICMP:Echo Request message is expected for it.

The presence confirmation response receiving unit 108 of this exemplary embodiment is different from those of the first and second exemplary embodiments in that the unit further has a function of, when sending a notification representing that a presence confirmation response message has been received, extracting an identifier contained in the presence confirmation response message and sending the identifier together with the reception result. More specifically, the presence confirmation response receiving unit 108 has a function of extracting an identifier from an appropriate portion of a presence confirmation response message which is expected to be formed from the same data as that of the presence confirmation request. That is, the presence confirmation response receiving unit 108 has a function of extracting an identifier inserted by the presence confirmation request transmitting unit 107 from a portion where the identifier is expected to be included in the presence confirmation response message.

For example, when presence confirmation response message is an ICMP:Echo Reply message, the function is implemented by the field representing the identifier of the ICMP:Echo Reply message. It may be implemented by the field representing the sequence number. A portion other than the field indicating the identifier or sequence number is also usable. The payload portion of an ICMP:Echo Reply message is also usable. Note that although an ICMP:Echo Reply message has been exemplified here, the present invention is not limited to this. The message is not particularly limited if it is a presence confirmation response message corresponding to a presence confirmation request message transmitted by the presence confirmation request transmitting unit 107.

Note that the types of filtering rules corresponding to the types of presence confirmation request messages to be transmitted by the presence confirmation request transmitting unit 107 and the types of presence confirmation response messages to be determined as received by the presence confirmation response receiving unit 108, and the location of an identifier designated in a presence confirmation request message and presence confirmation response message may be held in the presence confirmation request transmitting unit 107 and the presence confirmation response receiving unit 108 in advance, or stored in a parameter storage unit (not shown) and read out from it.

Alternatively, the subnet determination unit 106 may grasp the types. In this case, the subnet determination unit 106 may transfer a presence confirmation request message to be transmitted itself to the presence confirmation request transmitting unit 107, acquire a received presence confirmation response message itself from the presence confirmation response receiving unit 108, and compare the presence confirmation request message with the presence confirmation response message.

The wireless communication terminal 1 implements the processes of the above-described units by causing a CPU 401 to load programs stored in a storage unit 109 to a main storage unit 402 and execute them, as in the first exemplary embodiment.

Operation of Third Exemplary Embodiment

The operations of the wireless communication system according to the third exemplary embodiment of the present invention will be described next with reference to FIG. 14. FIG. 14 is a sequence chart showing the operation of the wireless communication system according to the third exemplary embodiment of the present invention. Points different from the operations of the first and second exemplary embodiments of the present invention will mainly be explained below.

Note that the processes of this exemplary embodiment are implemented by causing the CPU 401 of the wireless communication terminal 1 to load the programs stored in the storage unit 109 to the main storage unit 402 and execute them.

Referring to FIG. 14, first, the wireless communication terminal 1 performs connection negotiation with a wireless base station 2 (step G1), and then performs IP setting processing (step G2), thereby enabling IP data communication with a device on the network via the wireless base station 2, as in the first and second exemplary embodiments (step G3). Note that as the IP address setting acquisition method, information of an IP address and the like stored in advance may be set. Alternatively, information of an IP address and the like may dynamically be acquired.

Next, the wireless communication terminal 1 starts data communication with a communication apparatus (step G3), as in the second exemplary embodiment. Note that the data communication started here between the wireless communication terminal 1 and a communication apparatus 12 is continuously performed from then on. Note that the start of data communication between the wireless communication terminal 1 and the communication apparatus 12 is not limited to this timing. The data communication is intended to start before handover to be executed later.

Next, while keeping the IP data communication with the communication apparatus via the wireless base station 2, the wireless communication terminal 1 performs an operation of searching for another wireless base station to detect a wireless base station of higher communication quality while keeping the connection to the wireless base station 2 without disconnecting it (steps G4 and G5), as in the first and second exemplary embodiments.

As in the first and second exemplary embodiments, the wireless communication terminal 1 acquires the search result while keeping the connection to the wireless base station 2 (steps G6 and G7), extracts an identifier unique to a wireless base station from the search result and transmits a presence confirmation request message to the wireless base station based on the extracted identifier unique to the wireless base station, and executes subnet determination in accordance with the reception result of a presence confirmation response message for the transmitted presence confirmation request message, thereby determining whether the wireless base station exists in the same subnet as that of the wireless communication terminal 1. However, the operation is different from those of the first and second exemplary embodiments in that subnet determinations can simultaneously be executed for a plurality of wireless base stations acquired from the search result (steps G8 and G9).

In the first and second exemplary embodiments, subnet determination needs to be executed sequentially for each wireless base station because simultaneously transmitting a plurality of presence confirmation request messages makes it difficult to identify a presence confirmation response message corresponding to each transmitted presence confirmation request message. That is, when there are a plurality of wireless base stations, a correspondingly long time is necessary for executing and completing subnet determination for all wireless base stations.

At this time, the network access control unit 105, subnet determination unit 106, presence confirmation collation unit 111, presence confirmation request transmitting unit 107, and presence confirmation response receiving unit 108 of the wireless communication terminal 1 operate in the following way.

The network access control unit 105 acquires the wireless base station search result. If the search result includes a plurality of wireless base stations, the network access control unit 105 extracts identifiers unique to all the wireless base stations, and requests the subnet determination unit 106 to execute subnet determination. Note that the network access control unit 105 may simultaneously send all identifiers from the search result, or continuously send a request before obtaining a result for one request.

For example, when wireless base stations 3 and 4 have been detected, two MAC addresses "00:00:4C:00:01:01" and "00:00:4C:00:002:01" are sent to the subnet determination unit 106.

Upon receiving a request to execute subnet determination from the network access control unit 105, the subnet determination unit 106 and the presence confirmation collation unit 111 execute subnet determination for each of the received MAC addresses. The presence confirmation collation unit 111 selects a MAC address and a corresponding uniquely identifiable identifier, and stores them as a set (F1, F2, and F3 in FIG. 13). If there are a plurality of received MAC addresses, the presence confirmation collation unit 111 similarly selects and stores each MAC address and a corresponding uniquely identifiable identifier.

The subnet determination unit 106 sends the MAC addresses and added identifiers, and also requests the presence confirmation request transmitting unit to transmit a presence confirmation request message. Note that if a plurality of sets of MAC addresses and identifiers are held, the subnet determination unit 106 sends them sequentially to the presence confirmation request transmitting unit 107 so that presence confirmation request messages are transmitted to all the MAC addresses. After sending the request to the presence confirmation request transmitting unit 107, the subnet determination unit 106 starts a counter corresponding to each identifier.

For example, when the subnet determination unit 106 and the presence confirmation collation unit 111 receive two MAC addresses "00:00:4C:00:01:01" and "00:00:4C:00:02:01" from the network access control unit 105, the presence confirmation collation unit 111 selects a unique identifier managed for each MAC address. In this case, identifier "1" is selected in correspondence with the MAC address "00:00:4C:00:01:01" (F4 and F5 in FIG. 13). Identifier "2" is selected and stored in correspondence with the MAC address "00:00:4C:00:02:01" (F6 and F7 in FIG. 13). That is, transmission requests are continuously sent to the presence confirmation request transmitting unit 107 in correspondence with the set of the MAC address "00:00:4C:00:01:01" and identifier "1" and the set of the MAC address "00:00:4C:00:02:01" and identifier "2".

The presence confirmation request transmitting unit 107 generates data to be exchanged in the data link layer based on the MAC addresses received from the subnet determination unit 106, as in the first and second exemplary embodiments. The presence confirmation request transmitting unit 107 also inserts each identifier received together into the data, and transmits it via a communication control unit 101. For example, if the presence confirmation request message is an ICMP:Echo Request message, the identifier is inserted into the identifier field.

More specifically, upon receiving the MAC address "00:00:4C:00:01:01" and identifier "1", the presence confirmation request transmitting unit 107 designates identifier "1" in the identifier field, and transmits an IP broadcast ICMP:Echo Request message including the designation MAC address "00:00:4C:00:01:01" (step G8). Upon receiving the MAC address "00:00:4C:00:02:01" and identifier "2", the presence confirmation request transmitting unit 107 designates identifier "2" in the identifier field, and transmits an IP broadcast ICMP:Echo Request message including the designation MAC address "00:00:4C:00:02:01" (step G9).

Upon determining that received data is a presence confirmation response message, the presence confirmation response receiving unit 108 notifies the subnet determination unit 106 of it, as in the first and second exemplary embodiments. In this exemplary embodiment, the presence confirmation response receiving unit 108 also extracts an identifier from the presence confirmation response message, and sends the result to the subnet determination unit 106 together with the extracted identifier.

That is, when the presence confirmation request transmitting unit 107 has transmitted data with the destination MAC address "00:00:4C:00:01:01", the presence confirmation response receiving unit 108 receives a presence confirmation response message (step G10), extracts identifier "1" from the field indicating the identifier, and sends identifier "1" to the subnet determination unit 106 together with the reception notification. On the other hand, when the presence confirmation request transmitting unit 107 has transmitted data with the destination MAC address "00:00:4C:00:02:01", no presence confirmation response message is received.

The subnet determination unit 106 notifies the network access control unit 105 of the subnet determination result based on the result from the presence confirmation response receiving unit 108. If time-out has occurred without obtaining any result from the presence confirmation response receiving unit 108, the subnet is determined to be different, as in the first and second exemplary embodiments (step G11).

Note that the subnet determination unit 106 holds a counter for each identifier. The subnet determination unit 106 receives a result notification from the presence confirmation response receiving unit 108, and determines a MAC address for which a response has been obtained based on an identifier, thereby executing subnet determination.

More specifically, upon receiving a result notification representing reception and identifier "1" from the presence confirmation response receiving unit 108, the subnet determination unit 106 determines, based on information stored in the presence confirmation collation unit 111, that the response corresponds to the MAC address "00:00:4C:00:01:01", and sends a determination result representing that the subnet is the same to the network access control unit 105 together with the MAC address "00:00:4C:00:01:01". On the other hand, if time-out has occurred in the counter corresponding to identifier "2" without obtaining a reception result indicating identifier "2" from the presence confirmation response receiving unit 108, the subnet determination unit 106 determines that no response has been received for the MAC address "00:00:4C:00:02:01", and sends a determination result representing that the subnet is different to the network access control unit 105 together with the MAC address "00:00:4C:00:02:01". Note that after obtaining the subnet determination result, a set of a MAC address and an identifier for which a result has been obtained may be deleted from the storage.

As a result, the network access control unit 105 acquires the subnet determination results for the wireless base stations 3 and 4. That is, the network access control unit 105 can grasp that the wireless base station 3 having the MAC address "00:00:4C:00:01:01" exists in the same subnet as that of the wireless base station connected to the wireless communication terminal 1, and the wireless base station 4 having the MAC address "00:00:4C:00:02:01" exists in a subnet different from that of the wireless base station connected to the wireless communication terminal 1.

Next, upon selecting to switch the connection to another wireless base station based on the wireless base station search result, the wireless communication terminal 1 performs an operation of preferentially selecting, as a switching destination wireless base station, a wireless base station that exists in the same subnet as that of the wireless base station connected to the wireless communication terminal 1 based on the result of previous executed subnet determination.

More specifically, the wireless communication terminal 1 connected to a wireless base station switches the connection to another wireless base station based on a wireless base station selection condition that a wireless base station belonging to the same subnet as that of the wireless base station connected to the wireless communication terminal 1 is preferentially determined as the connection destination in the wireless base station search result. In this case, first, a connection destination wireless base station is selected from wireless base stations existing in the same subnet. If no connection destination wireless base station is included in the wireless base stations existing in the same subnet, or if there is no wireless base station existing in the same subnet, the connection destination wireless base station is selected from wireless base stations that do not exist in the same subnet. That is, as for the wireless base stations 3 and 4, the wireless base station 3 is preferentially selected.

Note that when the wireless communication terminal 1 determines whether to switch the wireless base station, the switching processing may be triggered by a decrease in the received field strength of the currently connected wireless base station below a threshold held in advance, detection of a wireless base station having a received field strength higher than that of the currently connected wireless base station, or any other event which is not particularly limited.

The wireless communication terminal 1 may select a connection destination wireless base station based on another wireless base station selection condition that a wireless base station having a highest received field strength is preferentially connected. The determination may be done based on whether the wireless communication terminal has setting information necessary for connection to a wireless base station, or whether the received field strength has a predetermined value or more held in advance, and the condition is not particularly limited. That is, if the wireless base station 3 deserves to be the switching destination, the wireless base station 3 is selected as the switching destination wireless base station. Only when the wireless base station 3 is not appropriate as the switching destination, an option of selecting the wireless base station 4 arises.

The operation of the wireless communication terminal 1 after the switching processing to the selected wireless base station has been executed is the same as in the second exemplary embodiment. That is, when switching processing to the wireless base station 3 that exists in the same subnet as that of the wireless base station 2 connected to the wireless communication terminal 1 has been executed, IP setting processing is curtailed. On the other hand, when switching processing to the wireless base station 4 has been executed, the normal operation is performed without curtailing IP setting processing.

This allows the wireless communication terminal 1 to preferentially select, as the connection destination, the wireless base station 3 belonging to the same subnet as that of the wireless base station 2 connected to the wireless communication terminal 1, and suppress interruption of IP data communication caused by unnecessary IP address reset processing and degradation in the communication quality.

Note that this exemplary embodiment can be combined with one or both of the above-described first and second exemplary embodiments.

Effects of Third Exemplary Embodiment

As described above, according to this exemplary embodiment, the network access control unit performs handover control so as to switch the connection with the currently connected wireless base station to a connection with one wireless base station selected from new wireless base stations based on a predetermined wireless base station selection condition.

At this time, a wireless base station belonging to the same subnet as that of the wireless base station currently connected to the wireless communication terminal 1 is preferentially selected from the found wireless base stations as the switching destination wireless base station based on the subnet determination result of the subnet determination unit.

It is therefore possible to raise the ratio of continuing IP data communication using the same information of the IP address and the like even after switching the wireless base station. This allows to prevent an unnecessary IP address change upon switching the wireless base station, and minimize degradation in the communication quality caused by switching the wireless base station.

For example, if wireless base station switching has occurred during speech communication on IP data communication, the IP address changes depending on the wireless base station switching. Accordingly, a speech communication application 110 requires control signal exchange in accordance with the IP address change, and considerable loss is unavoidable before resuming the speech communication based on the changed IP address. However, this exemplary embodiment can avoid this in advance.

In addition, in this exemplary embodiment, an identifier is added to a field which is expected to have the same value in a presence confirmation request message and a presence confirmation response message. For this reason, even when a plurality of presence confirmation request messages are transmitted simultaneously, they can be associated with presence confirmation response messages. This enables to simultaneously execute a plurality of subnet determinations, as compared to a case in which subnet determinations are executed sequentially one by one, and thus quickly obtain results. This is particularly effective when there is a lot of wireless base station search results, or the time up to wireless base station switching is not sufficient.

Fourth Exemplary Embodiment

A wireless communication terminal according to the fourth exemplary embodiment of the present invention will be described next. Since this exemplary embodiment is a modification of the first exemplary embodiment, different points between them will mainly be explained below.

In the wireless communication terminal 1 according to the first exemplary embodiment, the communication control unit 101 and the communication interface unit use the wireless LAN (IEEE:802.11) technology. A communication control unit 101 of this exemplary embodiment uses the WiMAX (Worldwide Interoperability for Microwave Access) technology.

More specifically, a function of collecting notification information transmitted from a wireless base station, which is provided in the communication control unit 101 of this exemplary embodiment, includes a function of collecting a DCD (Downlink Channel Descriptor) message or a DL-MAP (Downlink Access Definition) message transmitted from a wireless base station. For example, a BSID (Base Station ID) representing an identifier unique to a wireless base station is acquired from these messages.

Note that this exemplary embodiment can also be a modification of the second or third exemplary embodiment.

Hence, according to this exemplary embodiment, it is possible to acquire, by using the WiMAX (IEEE 802.16) technology, the same effects as in the first to third exemplary embodiments using the wireless LAN (IEEE:802.11) technology.

A wireless communication terminal 1 implements the processes of the above-described units by causing a CPU 401 to load programs stored in a storage unit 109 to a main storage unit 402 and execute them, as in the first exemplary embodiment.

Fifth Exemplary Embodiment

A wireless communication terminal according to the fifth exemplary embodiment of the present invention will be described next. Since this exemplary embodiment is a modification of the first exemplary embodiment, different points between them will mainly be explained below.

In the wireless communication terminal 1 according to the first exemplary embodiment, a presence confirmation request message transmitted from a presence confirmation request transmitting unit 107 is formed from an IPv6 protocol, and an IP address generated by combining the prefix portion of a network address acquired by a router advertisement the wireless communication terminal 1 has received from a router 6 and a MAC address acquired from a subnet determination unit 106 is used as a transmission designation IP address, unlike the above-described exemplary embodiments.

Note that this exemplary embodiment can also be a modification of one of the second to fourth exemplary embodiments.

As described above, according to this exemplary embodiment, a presence confirmation message can be formed using a specific IP address as the transmission designation. Presence confirmation can be executed using not only a UDP but also a TCP protocol. Note that in this case, for example, it is possible to additionally execute presence confirmation using a response by an ACK+SYN message for a SYN message or a response by a RESET message by utilizing the characteristic feature of connection-type communication by TCP.

The wireless communication terminal 1 implements the processes of the above-described units by causing a CPU 401 to load programs stored in a storage unit 109 to a main storage unit 402 and execute them, as in the first exemplary embodiment.

Sixth Exemplary Embodiment

A wireless communication terminal according to the sixth exemplary embodiment of the present invention will be described next. Different points between this exemplary embodiment and the above-described exemplary embodiments will mainly be explained below.

The sixth exemplary embodiment is different from the above-described exemplary embodiments in that a subnet determination unit 106, presence confirmation request transmitting unit 107, and presence confirmation response receiving unit 108 perform the following operations.

In the above-described exemplary embodiments, upon receiving a request to execute presence confirmation from the network access control unit 105, the subnet determination unit 106 executes presence confirmation using one kind of presence confirmation message. However, the subnet determination unit 106 of this exemplary embodiment executes presence confirmation using a plurality of presence confirmation messages of different types for one MAC address.

Upon receiving message types from the subnet determination unit 106 together with a MAC address, the presence confirmation request transmitting unit 107 of this exemplary embodiment transmits different presence confirmation request messages in accordance with the received message types, unlike the above-described exemplary embodiments.

Upon receiving a presence confirmation response message, the presence confirmation response receiving unit 108 of this exemplary embodiment sends the message type to the subnet determination unit 106 in addition to a reception notification, unlike the above-described exemplary embodiments.

Operation of Sixth Exemplary Embodiment

The operation of the wireless communication terminal according to the sixth exemplary embodiment of the present invention will be described next.

Upon receiving a request to execute presence confirmation from the network access control unit 105, the subnet determination unit 106 of a wireless communication terminal 1 sends a plurality of requests to the presence confirmation request transmitting unit 107 so as to transmit presence confirmation request messages of different message types for one MAC address. Note that these requests may continuously be sent, or sending a next request may wait until reception of a response for one request.

The presence confirmation request transmitting unit 107 transmits presence confirmation messages of the designated message types in accordance with the requests from the subnet determination unit 106.

Upon receiving a presence confirmation response message, the presence confirmation response receiving unit 108 sends the message type to the subnet determination unit 106 in addition to a reception notification.

If a presence confirmation response has been received for at least one of the plurality of sent presence confirmation request messages of different message types, the subnet determination unit 106 determines that the device belongs to the same subnet. If no presence confirmation response message has been received even after the elapse of a predetermined time from the presence confirmation request message transmission, the device is determined to belong to a different subnet.

This allows to use another presence confirmation request message when a wireless base station does not support a specific presence confirmation request message. Various wireless base stations can be expected to support the system, and the effect of the exemplary embodiment can be expected in a broader range.

Note that this exemplary embodiment can be combined with one or any of the above-described first to fifth exemplary embodiments.

The wireless communication terminal 1 implements the processes of the above-described units by causing a CPU 401 to load programs stored in a storage unit 109 to a main storage unit 402 and execute them, as in the first exemplary embodiment.

The present invention has been described above with reference to the preferred exemplary embodiments. However, the present invention is not limited to the above-described exemplary embodiments, and various changes and modifications can be made within the technical scope of the invention.

For example, in the above-described exemplary embodiments, arrangement examples using the wireless LAN (IEEE: 802.11) technology have been described. However, the present invention is not limited to wireless LAN, and may use, e.g., the Bluetooth®, UWB (Ultra Wide Band), or 3G (3rd Generation: 3rd generation cellular phone scheme) technology.

INDUSTRIAL APPLICABILITY

The present invention is applicable when switching a currently connected base station in a network that requires a communication terminal having a wireless interface, and particularly effective when frequently moving between base stations.

The invention claimed is:

1. A wireless communication terminal which determines, before a handover, whether a wireless base station as a handover candidate belongs to the same subnet as that of the currently connected wireless base station, comprising:
   an address acquisition unit which acquires, via a wireless communication interface unit, a layer 2 address of a wireless communication interface of a new wireless base station different from a currently connected wireless base station;
   a presence confirmation request generation unit which generates a presence confirmation request message by designating the acquired layer 2 address as a destination address, and one of a broadcast address and a multicast address as a layer 3 address;
   a presence confirmation request transmitting unit which transmits, via the currently connected wireless base station, the presence confirmation request message specifically to the new base station, whose IP address is unknown to the terminal, by using the layer 2 address and the layer 3 address;
   a presence confirmation response receiving unit which receives a presence confirmation response message for the presence confirmation request message; and
   a subnet determination unit which, when said presence confirmation response receiving unit has received the presence confirmation response message replied from the new wireless base station in response to a match between the destination address and the layer 2 address, determines that the new wireless base station belongs to the same subnet as that of the currently connected wireless base station, and when said presence confirmation response receiving unit has not received the presence confirmation response message, determines that the new wireless base station belongs to a subnet different from that of the currently connected wireless base station.

2. A wireless communication terminal according to claim 1, wherein
   said presence confirmation request transmitting unit transmits a plurality of presence confirmation request messages of different types using the layer 2 address as the designation address, and
   when said presence confirmation response receiving unit has received a presence confirmation response message for at least one of the plurality of presence confirmation request messages of different types, said subnet determination unit determines that the new wireless base station belongs to the same subnet as that of the currently connected wireless base station.

3. A wireless communication terminal according to claim 1, wherein when a preset time has elapsed from a point of time the presence confirmation request message has been transmitted before said presence confirmation response receiving unit receives the presence confirmation response message, said subnet determination unit determines that the new wireless base station belongs to a subnet different from that of the currently connected wireless base station.

4. A wireless communication terminal according to claim 1, wherein the presence confirmation request message to be transmitted by said presence confirmation request transmitting unit is formed by encapsulating data to be communicated on an IP protocol and designating one of the broadcast address and the multicast address as a transmission designation IP address of an IP header.

5. A wireless communication terminal according to claim 1, wherein the presence confirmation request message to be transmitted by said presence confirmation request transmitting unit is formed by encapsulating data to be communicated on an IP protocol and designating, as a transmission designation IP address of an IP header, an IP address generated by combining the layer 2 address and a network prefix portion of a router advertisement message given by a router on an IPv6 protocol.

6. A wireless communication terminal according to claim 4, wherein
   the data to be communicated on the IP protocol and transmitted by said presence confirmation request transmitting unit is an ICMP:Echo Request message, and
   the presence confirmation response message to be received by said presence confirmation response receiving unit is data formed by encapsulating an ICMP:Echo Reply message.

7. A wireless communication terminal according to claim 1, wherein
the presence confirmation request message is data formed by encapsulating upper layer data and to be communicated in a data link layer, for which a communication apparatus which has received the upper layer data returns, to the wireless communication terminal which has transmitted the data, data formed by encapsulating upper layer data as a response to the upper layer data and to be communicated in the data link layer, and
the presence confirmation response message is the data returned by the communication apparatus.

8. A wireless communication terminal according to claim 1, wherein
said presence confirmation request generation unit generates the presence confirmation request message which is data link layer request data formed by designating the layer 2 address acquired by said address acquisition unit as the destination and the layer 2 address of the wireless communication terminal itself as the transmission source, for which a communication apparatus which has received the data link layer request data returns, to the wireless communication terminal which has transmitted the data, data link layer response data as a response to the data link layer data, and
when an elapsed time from a point of time the presence confirmation request message has been transmitted has exceeded a preset time without receiving the presence confirmation response message by said presence confirmation response receiving unit, said subnet determination unit determines that the new wireless base station belongs to a different subnet.

9. A wireless communication terminal according to claim 1, further comprising an identifier selection unit which extracts an identifier uniquely identifiable between wireless communication terminals,
wherein said presence confirmation request transmitting unit inserts the identifier selected by said identifier selection unit into part of the presence confirmation request message,
upon receiving the presence confirmation response message, said presence confirmation response receiving unit extracts an identifier inserted into part of the presence confirmation response message, and
said subnet determination unit compares the identifier inserted into the presence confirmation request message with the identifier extracted from the presence confirmation response message, thereby associating the presence confirmation request message with the presence confirmation response message.

10. A wireless communication terminal according to claim 1, further comprising a network access control unit which performs handover control so as to switch connection with the currently connected wireless base station to connection with one wireless base station selected from the new wireless base stations based on a predetermined wireless base station selection condition in handover control.

11. A wireless communication terminal according to claim 10, wherein a condition that the wireless base station is selected from new wireless base stations determined to belong to the same subnet based on a result of said subnet determination unit, and when no appropriate wireless base station is included in the new wireless base stations determined to belong to the same subnet, the wireless base station is selected from new wireless base stations determined to belong to different subnets is used as the wireless base station selection condition.

12. A wireless communication terminal according to claim 10, wherein
said address acquisition unit acquires a received field strength together with the layer 2 address of each of the new wireless base stations, and
a condition that a wireless base station having a highest received field strength higher than a preset threshold is selected from the new wireless base stations is used as the wireless base station selection condition.

13. A wireless communication terminal according to claim 10, further comprising:
an IP continuation determination unit which determines to continuously use IP address information when the subnet is determined to be the same based on the determination result of said subnet determination unit, and determines to reacquire the IP address information when the subnet is determined to be different; and
an IP connection control unit which controls to interrupt IP data communication immediately before said network access control unit executes wireless base station switching, when the wireless base station switching is completed, and it is determined based on a determination result of said IP continuation determination unit that the IP address information will continually be used, immediately resume the IP data communication using the IP address information used before the wireless base station switching, and when it is determined to reset the IP address information, reacquire the IP address information after the wireless base station switching, and resume the IP data communication using the reacquired IP address information.

14. A wireless communication terminal according to claim 13, wherein
when the wireless communication terminal is temporarily disconnected from the wireless base station connected before handover and then subsequently connected to the same wireless base station again in the handover control, said subnet determination unit determines that the subnet is the same and
said IP continuation determination unit determines to continuously use the IP address information.

15. A wireless communication terminal according to claim 13, wherein said IP connection control unit uses, as the IP address information, information preset in the wireless communication terminal.

16. A wireless communication terminal according to claim 13, wherein the IP address information includes an IP address, a subnet mask, a default gateway, and a DNS server address.

17. A wireless communication terminal according to claim 13, wherein said IP connection control unit dynamically acquires the IP address information by exchange with a communication apparatus connected to a network.

18. A wireless communication terminal according to claim 17, wherein said IP connection control unit dynamically acquires the IP address using a DHCP protocol.

19. A wireless communication terminal according to claim 17, wherein said IP connection control unit dynamically acquires the IP address using an automatic address setting unit of IPv6.

20. A wireless communication method for determining, before a handover of a wireless communication terminal, whether a wireless base station as a handover candidate belongs to the same subnet as that of the currently connected wireless base station, comprising the steps of:
acquiring, via a wireless communication interface unit of the wireless communication terminal, a layer 2 address of a wireless communication interface of a new wireless base station, whose IP address is unknown, wherein the new wireless base station is different from a currently connected wireless base station;

generating a presence confirmation request message having the acquired layer 2 address as a destination address, and one of a broadcast address and a multicast address as a layer 3 address;

transmitting, via the currently connected wireless base station, the generated presence confirmation request message specifically to the new base station;

when a presence confirmation response message corresponding to the presence confirmation request message is received, automatically determining that the new wireless base station belongs to the same subnet as that of the currently connected wireless base station, and when the presence confirmation response message is not received within a predetermined period, automatically determining that the new wireless base station belongs to a subnet different from that of the currently connected wireless base station.

21. A wireless terminal which determines, before a handover, whether a wireless base station as a handover candidate belongs to the same subnet as that of the currently connected wireless base station, comprising:

an acquirer configured to acquire a layer 2 address of an interface of a new wireless base station different from a currently connected wireless base station;

a message generator configured to generate a request message by designating the acquired layer 2 address as a destination address, and one of a broadcast address and a multicast address as a layer 3 address;

a transmitter configured to transmit, via the currently connected wireless base station, the request message specifically to the new base station, whose IP address is unknown, by using the layer 2 address and the layer 3 address;

a receiver configured to receive a confirmation message in response to the request message; and a controller configured to determine:
that the new wireless base station belongs to the same subnet as that of the currently connected wireless base station when the receiver has received the confirmation message replied from the new wireless base station in response to a match between the destination address and the layer 2 address, and that the new wireless base station belongs to a subnet different from that of the currently connected wireless base station when the receiver has not received the confirmation message.

22. A wireless terminal according to claim 21, wherein the controller further preferentially selects a wireless base station belonging to the same subnet as the handover destination based on the subnet determination results.

23. A wireless terminal according to claim 21, wherein the controller further decides to continuously use the IP communication setting before the handover when the subnet determination result indicates that the new wireless base station belongs to the same subnet.

24. A wireless terminal according to claim 21, wherein the controller initiates a resetting of an IP communication prior to the handover when the subnet determination result indicates that the new wireless base station does not belong to the same subnet.

25. A wireless terminal according to claim 21, wherein the controller further comprising a filter which filters messages other than the confirmation message in response to the request message.

\* \* \* \* \*